US011057852B2

(12) United States Patent
Agiwal et al.

(10) Patent No.: US 11,057,852 B2
(45) Date of Patent: Jul. 6, 2021

(54) METHOD AND APPARATUS FOR RESOURCE ALLOCATION AND BANDWIDTH PART INACTIVITY TIMER HANDLING FOR VEHICLE-TO-EVERYTHING COMMUNICATION

(71) Applicant: Samsung Electronics Co., Ltd., Gyeonggi-do (KR)

(72) Inventors: Anil Agiwal, Gyeonggi-do (KR); Seungri Jin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 6 days.

(21) Appl. No.: 16/575,018

(22) Filed: Sep. 18, 2019

(65) Prior Publication Data
US 2020/0092833 A1  Mar. 19, 2020

Related U.S. Application Data

(60) Provisional application No. 62/732,775, filed on Sep. 18, 2018.

(51) Int. Cl.
*H04W 56/00* (2009.01)
*H04W 24/08* (2009.01)
(Continued)

(52) U.S. Cl.
CPC ......... *H04W 56/001* (2013.01); *H04L 5/0092* (2013.01); *H04W 4/40* (2018.02);
(Continued)

(58) Field of Classification Search
CPC .... H04L 5/0023; H04L 5/0092; H04W 24/08; H04W 48/12; H04W 56/001; H04W 68/00; H04W 72/042
(Continued)

(56) References Cited

U.S. PATENT DOCUMENTS

2015/0004901 A1  1/2015 Agiwal et al.
2018/0131487 A1  5/2018 Ly et al.
(Continued)

FOREIGN PATENT DOCUMENTS

WO   WO 2018/085682   5/2018

OTHER PUBLICATIONS

Samsung, "SI Window Determination for SI Message Acquisition", R1-1809472, 3GPP TSG-RAN2 Adhoc, Jul. 2-6, 2018, 7 pages.
(Continued)

*Primary Examiner* — Harun Chowdhury
(74) *Attorney, Agent, or Firm* — The Farrell Law Firm, P.C.

(57) ABSTRACT

A communication method and system for converging a fifth generation (5G) communication system for supporting higher data rates beyond a fourth generation (4G) system with a technology for Internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method by a terminal for acquiring a system information (SI) message is provided. The method includes receiving, from a base station, a plurality of synchronization signal blocks (SSBs), determining at least one physical downlink control channel (PDCCH) monitoring occasion associated with each of the plurality of SSBs in an SI window, and monitoring at least one PDCCH monitoring occasion associated with at least one of the plurality of SSBs to acquire the SI message.

12 Claims, 14 Drawing Sheets

(51) Int. Cl.
  *H04W 72/04* (2009.01)
  *H04W 76/11* (2018.01)
  *H04L 5/00* (2006.01)
  *H04W 76/27* (2018.01)
  *H04W 4/40* (2018.01)

(52) U.S. Cl.
  CPC ......... *H04W 24/08* (2013.01); *H04W 72/042* (2013.01); *H04W 76/11* (2018.02); *H04W 76/27* (2018.02)

(58) Field of Classification Search
  USPC ........................................ 370/252, 329, 330
  See application file for complete search history.

(56) References Cited

U.S. PATENT DOCUMENTS

| | | | |
|---|---|---|---|
| 2019/0230534 A1* | 7/2019 | John Wilson | H04W 24/08 |
| 2019/0394749 A1* | 12/2019 | Islam | H04W 72/042 |
| 2020/0275420 A1* | 8/2020 | Chen | H04W 68/00 |

OTHER PUBLICATIONS

Qualcomm Incorporated, "Remaining System Information Delivery Consideration", R1-1804776, 3GPP TSG RAN WG1 Meeting #92bis, Apr. 16-20, 2018, 5 pages.

Huawei et al., "Considerations on System Information Scheduling", R2-1805222, 3GPP TSG-RAN2 Meeting #101bis, Apr. 16-20, 2018, 2 pages.

Qualcomm Incorporated, "Consideration on SI Schedule", R2-1812743, 3GPP TSG-RAN WG2 Meeting #103, Aug. 20-24, 2018, 4 pages.

International Search Report dated Jan. 2, 2020 issued in counterpart application No. PCT/KR2019/012096, 8 pages.

* cited by examiner

METHOD AND APPARATUS FOR RESOURCE ALLOCATION AND BANDWIDTH PART INACTIVITY TIMER HANDLING FOR VEHICLE-TO-EVERYTHING COMMUNICATION

CROSS-REFERENCE TO RELATED APPLICATION(S)

This application is based on and claims priority under 35 U.S.C. § 119 (e) to U.S. Provisional application Ser. No. 62/732,775, filed on Sep. 18, 2018, in the U.S. Patent and Trademark Office, the disclosure of which is incorporated by reference herein in its entirety.

BACKGROUND

1. Field

The disclosure relates generally to a mobile communication system, and more particularly, to a system and a method of resource allocation and bandwidth part (BWP) inactivity timer handling for vehicle-to-everything (V2X) communication.

2. Description of Related Art

To meet the demand for wireless data traffic having increased since deployment of fourth generation (4G) communication systems, efforts have been made to develop an improved fifth generation (5G) or pre-5G communication system, also referred to as a 'beyond 4G network', a 'post long term evolution (LTE) system', or a new radio (NR) system. The 5G wireless communication system is considered to be implemented not only in lower frequency bands, but also in higher frequency (mmWave) bands, such as 10 GHz to 100 GHz bands, so as to achieve higher data rates. To mitigate propagation loss of the radio waves and increase the transmission distance, beamforming, massive multiple-input multiple-output (MIMO), full dimensional MIMO (FD-MIMO), array antenna, analog beam forming, and large scale antenna techniques are being considered in the design of the 5G wireless communication system. In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multi-points (CoMP), and reception-end interference cancellation, for example. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet is now evolving to the Internet of things (IoT) where distributed entities, such as things, exchange and process information without human intervention. The Internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth have been recently researched. Such an IoT environment may provide intelligent Internet technology services that create a new value to human life by collecting and analyzing data generated among connected things. In this case, IoT may be applied to a variety of fields including a smart home, smart building, smart city, smart car or connected cars, smart grid, health care, smart appliances, and advanced medical services through convergence and combination between existing information technology (IT) and various industrial applications.

Consistent with this, efforts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered as convergence between the 5G technology and the IoT technology.

Recently, several broadband wireless technologies have been developed to meet the growing number of broadband subscribers and to provide these and other additional and improved applications and services. The second generation (2G) wireless communication system was developed to provide voice services while ensuring the mobility of users. The third generation (3G) wireless communication system supports not only the voice service, but also data service. The 4G wireless communication system was developed to provide high-speed data service, but suffers from lack of resources to meet the growing demand for high-speed data services. Therefore, the 5G wireless communication system is being developed to meet the growing demand of various services with diverse requirements, such as high-speed data services, and to support ultra-reliability and low latency applications.

In addition, although the 5G wireless communication system is expected to address different use cases having divergent requirements in terms of data rate, latency, reliability, and mobility, it is expected that the design of the air-interface of the 5G wireless communication system would be flexible enough to serve user equipments (UEs) having divergent capabilities depending on the use case and market segment in which the UE caters service to the end customer.

Example use cases the 5G wireless communication system is expected to address include enhanced mobile broadband (eMBB), massive MTC (m-MTC), and ultra-reliable low latency communication (URLL). The eMBB requirements, such as high Gbps data rate, low latency, and high mobility, address the market segment representing the conventional wireless broadband subscribers needing Internet connectivity everywhere and full-time. The m-MTC requirements, such as very high connection density, infrequent data transmission, long battery life, and low mobility, address the market segment representing the IoT/IoE envisioning connectivity of billions of devices. The URLL requirements, such as very low latency, very high reliability and variable mobility, address the market segment representing the industrial automation application, and vehicle-to-vehicle/vehicle-to-infrastructure communication that is foreseen as one of the enablers for autonomous cars.

Vehicular communication services, represented by vehicle-to-everything (V2X) services, can include vehicle-to-vehicle (V2V), vehicle-to-infrastructure (V2I), vehicleto-network (V2N) and vehicle-to-pedestrian (V2P) types. V2X services can be provided by PC5 interface and/or Uu interface. Support of V2X services via PC5 interface is provided by V2X sidelink communication, which is a mode of communication whereby UEs can communicate with each other directly over the PC5 interface, and is supported when the UE is served by next generation radio access network (NG-RAN) and when the UE is outside of NG-RAN coverage. Only the UEs authorized to be used for V2X services can perform V2X sidelink communication.

The UE supporting V2X sidelink communication can operate in two modes for resource allocation:
(1) Scheduled resource allocation, in which:
   The UE needs to be radio resource control connected (RRC_CONNECTED) in order to transmit data, and
   The UE requests transmission resources from the next generation node B (gNB), which schedules transmission resources for transmission of sidelink control information and data.
(2) UE autonomous resource selection, in which:
   The UE unilaterally selects resources from resource pools and performs transport format selection to transmit sidelink control information and data, and
   The UE performs sensing for (re)selection of sidelink resources. Based on sensing results, the UE (re)selects some specific sidelink resources and reserves multiple sidelink resources.

A UE is considered in-coverage on the carrier used for V2X sidelink communication whenever it detects a cell on that carrier. If the UE that is authorized for V2X sidelink communication is in-coverage on the frequency used for V2X sidelink communication or if the gNB provides V2X sidelink configuration for that frequency (including when the UE is out of coverage on that frequency), the UE uses the scheduled resource allocation or UE autonomous resource selection as a per gNB configuration. When the UE is out of coverage on the frequency used for V2X sidelink communication and if the gNB does not provide V2X sidelink configuration for that frequency, the UE may use a set of transmission and reception resource pools pre-configured in the UE. V2X sidelink communication resources are not shared with other non-V2X data transmitted over the sidelink.

An RRC_CONNECTED UE may send a sidelink UE information message to the serving cell if it is interested in V2X sidelink communication transmission in order to request sidelink resources. If the UE is configured by upper layers to receive V2X sidelink communication and V2X sidelink reception resource pools are provided, the UE receives communication on those provided resources.

For V2X sidelink communication, sidelink transmission and/or reception resources including an exceptional pool for different frequencies for scheduled resource allocation and UE autonomous resource selection may be provided. The sidelink resources for different frequencies can be provided via dedicated signaling, system information block 21 (SIB21) and/or preconfiguration. The serving cell may indicate to the UE only the frequency on which the UE may acquire the resource configuration for V2X sidelink communication. If multiple frequencies and associated resource information are provided, it is up to UE implementation to select the frequency among the provided frequencies. The UE shall not use preconfigured transmission resource if the UE detects a cell providing resource configuration or inter-carrier resource configuration for V2X sidelink communication. Frequencies which may provide V2X sidelink communication resource configuration or cross-carrier configuration can be signaled in the SIB21 or pre-configured in the UE. The RRC_IDLE_UE may prioritize the frequency that provides cross-carrier resource configuration for V2X sidelink communication during cell reselection.

If the UE supports multiple transmission chains, it may simultaneously transmit on multiple carriers via PC5. When multiple frequencies for V2X are supported, a mapping between V2X service types and V2X frequencies is configured by upper layers. The UE should ensure a V2X service to be transmitted on the corresponding frequency. For scheduled resource allocation, the gNB can schedule a V2X transmission on a frequency based on the sidelink buffer status report (BSR), in which the UE includes the destination index uniquely associated with a frequency reported by the UE to the gNB in a sidelink UE information message.

Bandwidth adaptation (BA) is supported in the 5G system. With BA, the receive and transmit bandwidth of a UE does not need to be as large as the bandwidth of the cell and can be adjusted. The width can be ordered to change, such as to narrow during a period of low activity to save power. The location can move in the frequency domain, such as to increase scheduling flexibility. The subcarrier spacing can be ordered to change, such as to enable different services.

A subset of the total cell bandwidth of a cell is referred to as a bandwidth part (BWP) and BA is achieved by configuring the UE with BWP(s) and indicating to the UE which of the configured BWPs is currently the active BWP. A UE in an RRC-connected state is configured with one or more downlink (DL) and uplink (UL) BWPs for each configured serving cell, such as a primary cell (PCell) or secondary cell (SCell). For an activated serving cell, there is always one active UL and DL BWP at any point in time. The BWP switching for a Serving Cell is used to activate an inactive BWP and deactivate an active BWP at a time, and is controlled by the physical downlink control channel (PDCCH) indicating a downlink assignment or an uplink grant, by an bwp-InactivityTimer, by RRC signaling, or by a medium access control (MAC) entity itself upon initiation of a random access procedure. Upon addition of a special cell (SpCell) or activation of the SCell, the DL BWP and UL BWP indicated by firstActiveDownlinkBWP-Id and firstActiveUplinkBWP-Id respectively is active without receiving a PDCCH indicating a downlink assignment or an uplink grant. The active BWP for a serving cell is indicated by either the RRC or PDCCH. For the unpaired spectrum, a DL BWP is paired with a UL BWP, and BWP switching is common for both UL and DL. Upon expiration of a BWP inactivity timer, the UE switches the active DL BWP to the default DL BWP, or initial DL BWP if the default DL BWP is not configured.

Since the resource allocation mechanism in the prior art is deficient in terms of handling multiple BWPs, there is a need in the art for an enhanced resource allocation mechanism for V2X sidelink communication considering multiple BWPs on a carrier supporting sidelink communication. The active BWP for sidelink communication can be different from the active BWP for wider area network (WAN) communication. Sidelink communication can be supported on the same BWP as is used for WAN communication. The BWP inactivity timer considering the V2X sidelink communication also needs to be enhanced.

Each PDCCH monitoring occasion for system information (SI) message reception in an SI window is associated with one of the transmitted synchronization signal blocks (SSBs) (or SS/PBCH blocks). Based on this association a UE can determine the PDCCH monitoring occasion corresponding to one or more suitable SSBs, such as an SSB with a synchronization signal reference signal received power (SS-RSRP) above a threshold and monitor only these PDCCH monitoring occasions in an SI window.

In the existing system, a $K^{th}$ PDCCH monitoring occasion for SI message reception in the SI window corresponds to a $K^{th}$ transmitted SSB, but this mapping rule between PDCCH monitoring occasions for SI message reception in an SI window and transmitted SSBs works only if the number of PDCCH monitoring occasions for SI message reception in an SI window is equal to number of transmitted SSBs. Depending on the length of the SI window and other system information (OSI) search space configuration, the number of PDCCH monitoring occasions for SI message reception in an SI window can be greater than the number of transmitted SSBs. Thus, there is also a need in the art for an enhanced mapping rule between PDCCH monitoring occasions in an SI window and transmitted SSBs.

SUMMARY

Aspects of the disclosure are to address at least the above-mentioned problems and/or disadvantages and to provide at least the advantages described below. Accordingly, an aspect of the disclosure is to provide a communication method and system for converging a 5G communication system for supporting higher data rates beyond a 4G system.

Another aspect of the disclosure is to provide an enhanced resource allocation mechanism for V2X sidelink communication considering multiple BWPs on a carrier supporting sidelink communication.

Another aspect of the disclosure is to provide an enhanced mapping rule between PDCCH monitoring occasions in an SI window and transmitted SSBs. In accordance with an aspect of the disclosure, a method performed by a terminal for acquiring an SI message is provided. The method includes receiving, from a base station, a plurality of SSBs, determining at least one PDCCH monitoring occasion associated with each of the plurality of SSBs in an SI window, and monitoring at least one PDCCH monitoring occasion associated with at least one of the plurality of SSBs to acquire the SI message.

In accordance with another aspect of the disclosure, a terminal in a wireless communication system is provided. The terminal includes a transceiver, and a controller coupled with the transceiver and configured to control the transceiver to receive, from a base station, a plurality of SSBs, determine at least one PDCCH monitoring occasion associated with each of the plurality of SSBs in an SI window, and monitor at least one PDCCH monitoring occasion associated with at least one of the plurality of SSBs to acquire an SI message.

In accordance with another aspect of the disclosure, a method performed by a base station for transmitting an SI message is provided. The method includes transmitting a plurality of SSBs to a terminal, and transmitting the SI message to the terminal in at least one PDCCH monitoring occasion in an SI window using a downlink beam corresponding to an SSB associated with the at least one PDCCH monitoring occasion among the plurality of SSBs.

In accordance with another aspect of the disclosure, a base station in a wireless communication system is provided. The base station includes a transceiver and a controller coupled with the transceiver. The controller is configured to control the transceiver to transmit a plurality of SSBs to a terminal, and control the transceiver to transmit an SI message to the terminal in at least one PDCCH monitoring occasion in an SI window using a downlink beam corresponding to an SSB associated with the at least one PDCCH monitoring occasion among the plurality of SSBs.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
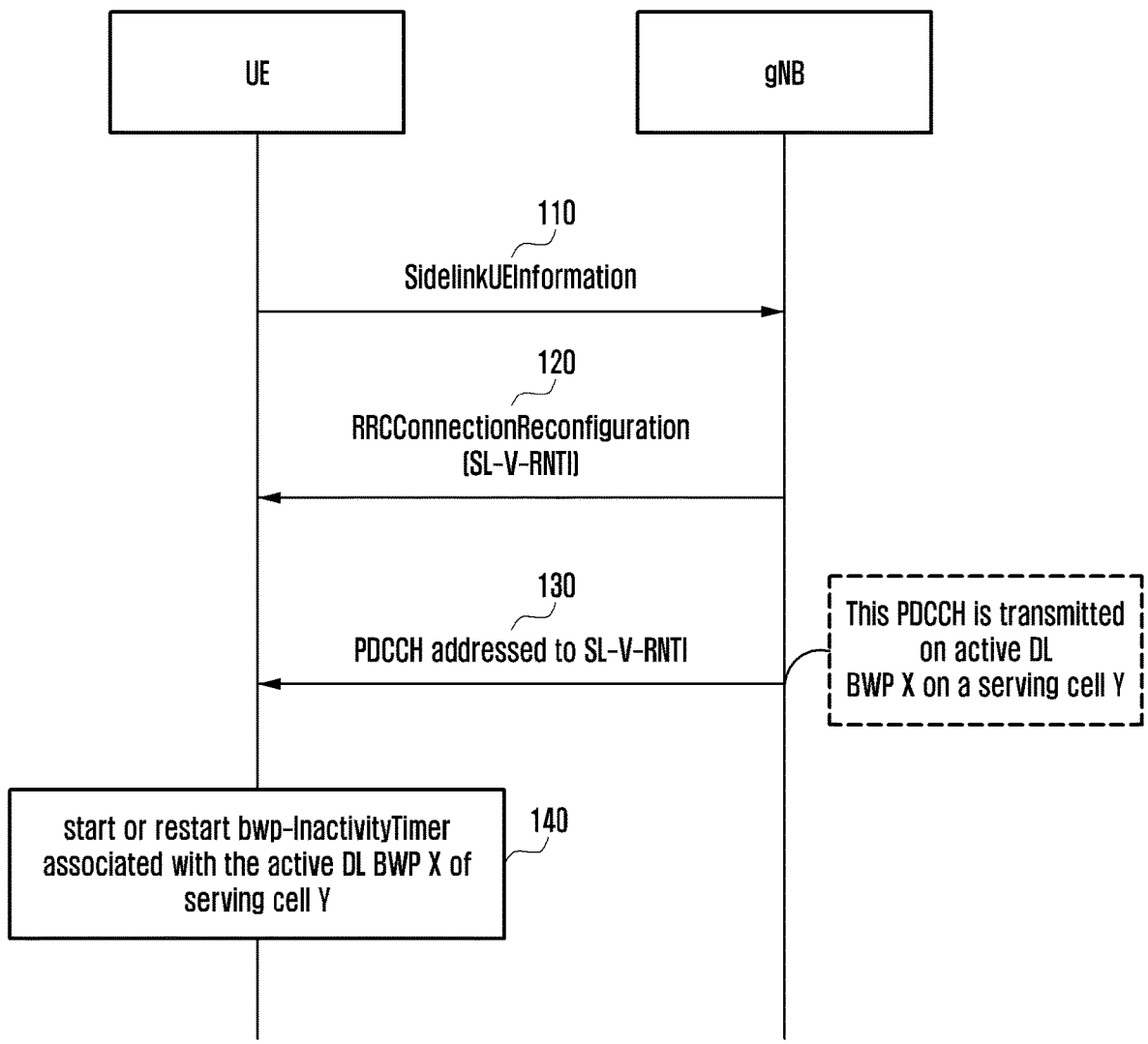
FIG. 1 illustrates a signaling flow between a UE and a gNB according to an embodiment.

The following description with reference to the accompanying drawings is provided to assist in a comprehensive understanding of embodiments of the disclosure. It includes various specific details to assist in that understanding, but these are to be regarded as examples. Accordingly, those of ordinary skill in the art will recognize that various changes and modifications of the embodiments described herein can be made without departing from the scope and spirit of the disclosure. In addition, descriptions of well-known functions and constructions may be omitted for the sake of clarity and conciseness.

The terms and words used in the following description and claims are not limited to their dictionary meanings, but, are merely used to enable a clear and consistent understanding of the disclosure. Accordingly, it should be apparent to those skilled in the art that the following detailed description is provided for illustration purposes only and not for the purpose of limiting the disclosure.

It is to be understood that the singular forms "a," "an," and "the" include plural referents unless the context clearly dictates otherwise. Thus, for example, reference to "a component surface" includes reference to one or more of such surfaces.

The term "substantially" indicates that the recited characteristic, parameter, or value need not be achieved exactly, but that deviations or variations, such as tolerances, measurement error, measurement accuracy limitations and other factors known to those skilled in the art, may occur in amounts that do not preclude the effect the characteristic was intended to provide.

As is known to those skilled in the art, blocks of a flowchart (or sequence diagram) and a combination of flowcharts may be represented and executed by computer program instructions that may be loaded on a processor of a general purpose computer, special purpose computer, or programmable data processing equipment. The loaded program instructions, when executed by the processor, create a means for performing functions described in the flowchart. Because the computer program instructions may be stored in a computer readable memory that is usable in a specialized computer or a programmable data processing equipment, it is also possible to create articles of manufacture that perform functions described in the flowchart. Because the computer program instructions may be loaded on a computer or programmable data processing equipment, when executed as processes, these instructions may perform operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be simultaneously executed or executed in reverse order.

In this description, the words "unit" and "module" may refer to a software component or hardware component, such as a field-programmable gate array (FPGA) or an application-specific integrated circuit (ASIC) capable of performing a function or an operation. However, a "unit", or the like, is not limited to hardware or software, and may be configured to reside in an addressable storage medium or to drive one or more processors. A "unit" may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting manner.

A "base station (BS)" is an entity communicating with a UE and may be referred to as a BS, base transceiver station (BTS), node B (NB), evolved NB (eNB), access point (AP), 5GNB, or gNB.

A "UE" is an entity communicating with a BS and may be referred to as a UE, device, mobile station (MS), mobile equipment (ME), or terminal.

Based on disclosed mapping between PDCCH monitoring occasions for SI message reception and SSBs in an SI window herein, a UE can determine a PDCCH monitoring occasion corresponding to one or more suitable SSBs, such as an SSB with an SS-RSRP above a threshold, and monitor only these PDCCH monitoring occasions in the SI-window irrespective of whether the number of PDCCH monitoring occasions in the SI window are greater than or equal to the number of transmitted SSBs.

1. BWP Inactivity Timer Handling for V2X Sidelink (SL) Communication

Embodiment 1

FIG. 1 illustrates a signaling flow between a UE and a gNB according to an embodiment.

For an activated serving cell, if the UE (or MAC entity in the UE) receives a PDCCH addressed to an SL vehicle radio network temporary identifier (SL-V-RNTI) indicating SL grant, on the active DL BWP of this serving cell, the UE starts or restarts the bwp-InactivityTimer associated with the active DL BWP. In FIG. 1, the SL grant can be for SL communication based on LTE radio access technology (RAT) or NR RAT.

A UE is configured with one or more serving cells. For each activated serving cell, one or more BWPs are configured by a gNB using RRC signaling. There is one active DL BWP and active UL BWP for each activated serving cell. A UE interested in V2X SL communication sends a signaling message (e.g. SidelinkUEInformation message) to request resources for V2X SL communication in step 110. The gNB assigns one or more SL-V-RNTIs to the UE and sends an RRC connection reconfiguration message including the assigned one or more SL-V-RNTIs in step 120. The UE monitors for a PDCCH addressed to the SL-V-RNTI in step 130. The PDCCH addressed to the SL-V-RNTI indicates an SL grant for V2X SL communication.

If the UE receives a PDCCH addressed to the SL-V-RNTI on an active DL BWP, which is configured with a BWP identifier (ID) X, of a serving cell Y, the UE starts or restarts a bwp-InactivityTimer associated with the active DL BWP of serving cell Y in step 140. This operation is performed if a default DL BWP is configured and an active DL BWP is not the default DL BWP. This operation is also performed if a default DL BWP is not configured and an active DL BWP is not the initial DL BWP.

Alternately, if the UE receives a PDCCH addressed to the SL-V-RNTI on an active DL BWP, which is configured with BWP ID X, of a serving cell Y, and serving cell Y is a time division duplex (TDD) cell, the UE starts or restarts a bwp-InactivityTimer associated with the active DL BWP X of serving cell Y. This operation is performed if a default DL BWP is configured and an active DL BWP is not the default DL BWP. This operation is also performed if the default DL BWP is not configured and the active DL BWP is not the initial DL BWP.

The above method is also performed for a PDCCH addressed to an SL semi-persistent scheduling vehicle radio network temporary identifier (SL-SPS-V-RNTI). An NR gNB can configure the SL-SPS-V-RNTI separately for SL communication based on the LTE RAT and NR RAT. The above operation is also performed for a PDCCH addressed to the SL-SPS-V-RNTI for SL communication based on the LTE RAT and on the NR RAT.

Embodiment 2

Figure 2:
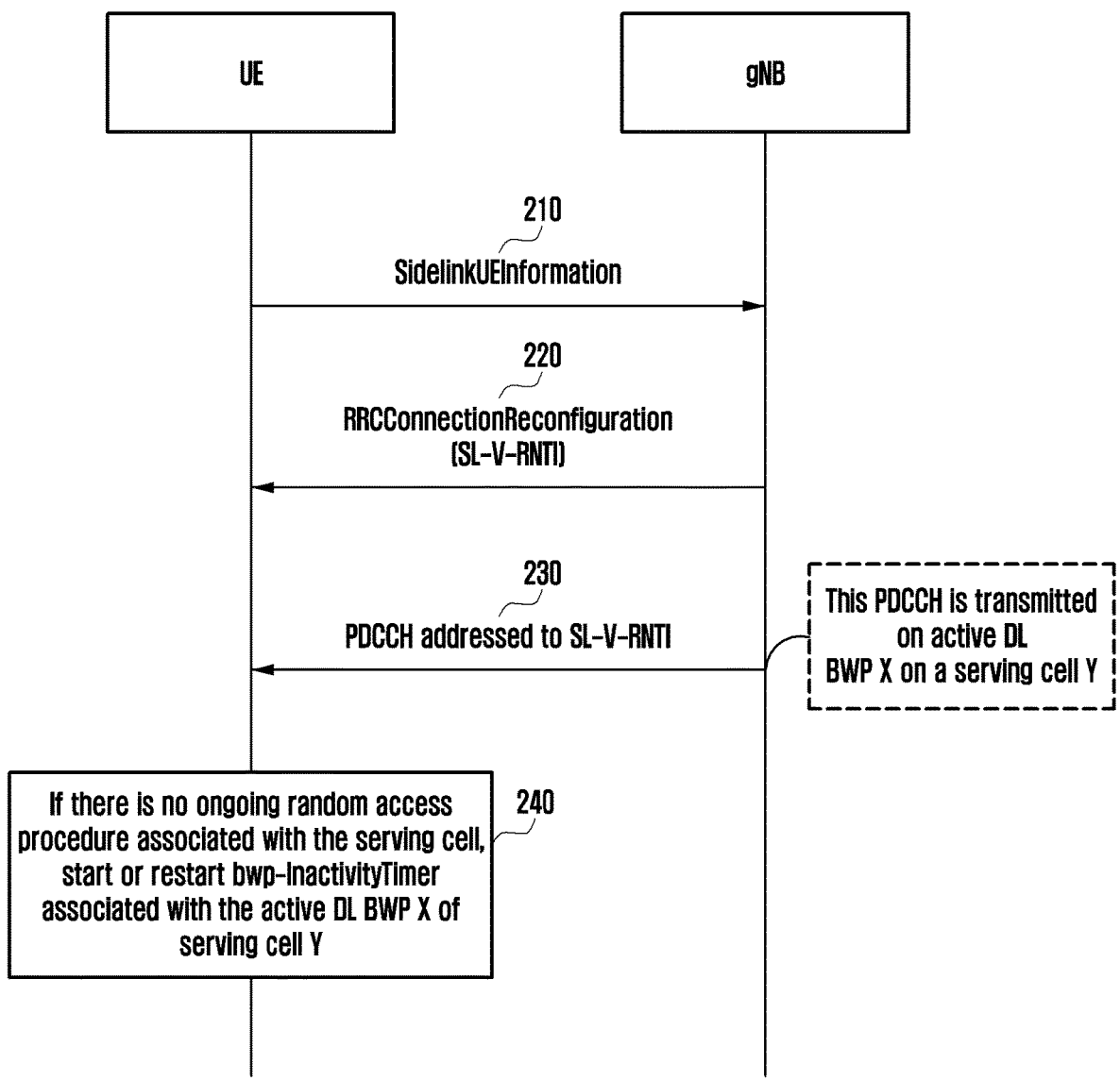
FIG. 2 illustrates a signaling flow between a UE and a gNB according to an embodiment.

FIG. 2 illustrates a signaling flow between a UE and a gNB according to an embodiment. In FIG. 2, the SL grant can be for SL communication based on the LTE RAT or NR RAT.

For an activated serving cell, if the UE receives a PDCCH addressed to the SL-V-RNTI indicating SL grant, on the active DL BWP of this serving cell and there is no ongoing random access procedure associated with this serving cell, the UE starts or restarts the bwp-InactivityTimer associated with the active DL BWP.

The UE is configured with one or more serving cells. For each activated serving cell, one or more BWPs are configured by the gNB using RRC signaling. There is one active DL BWP and UL BWP for each activated serving cell. A UE interested in V2X SL communication sends a signaling message (e.g. SidelinkUEInformation message) to request resources for V2X SL communication in step 210. The gNB assigns one or more SL-V-RNTIs to the UE and sends an RRC connection reconfiguration message including the assigned one or more SL-V-RNTIs in step 220. The gNB sends a PDCCH addressed to the SL-V-RNTI, and the UE monitors for the PDCCH addressed to the SL-V-RNTI in step 230. The PDCCH addressed to the SL-V-RNTI indicates an SL grant for V2X SL communication.

If the UE receives a PDCCH addressed to the SL-V-RNTI on an active DL BWP of a serving cell Y and there is no ongoing random access procedure associated with serving cell Y, the UE starts or restarts a bwp-InactivityTimer associated with the active DL BWP X of serving cell Y in step 240. This operation is performed if the default DL BWP is configured and the active DL BWP is not the default DL BWP, and is also performed if the default DL BWP is not configured and the active DL BWP is not the initial DL BWP.

Alternately, if the UE receives a PDCCH addressed to the SL-V-RNTI on an active DL BWP of a serving cell Y and there is no ongoing random access procedure associated with serving cell Y and the serving cell is a TDD cell, the UE starts or restarts a bwp-InactivityTimer associated with the active DL BWP X of serving cell Y This operation is performed if the default DL BWP is configured and the active DL BWP is not the default DL BWP, and is also performed if the default DL BWP is not configured and the active DL BWP is not the initial DL BWP.

The above operation is also performed for a PDCCH addressed to the SL-SPS-V-RNTI. An NR gNB can configure the SL-SPS-V-RNTI separately for SL communication based on the LTE RAT and NR RAT. The above operation is also performed for a PDCCH addressed to the SL-SPS-V-RNTI for SL communication based on the LTE RAT and on the NR RAT.

Embodiment 3

Figure 3:
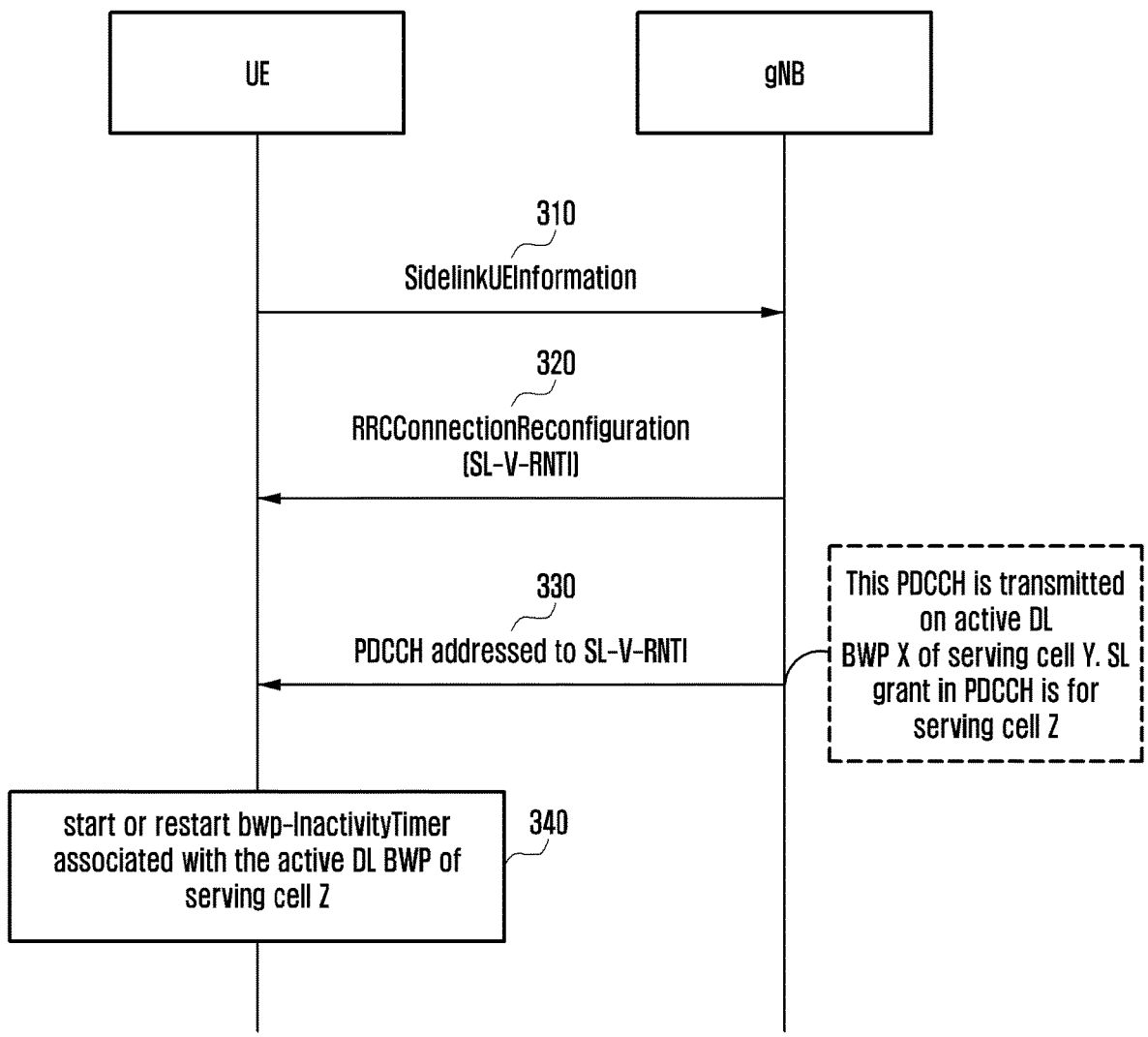
FIG. 3 illustrates a signaling flow between a UE and a gNB according to an embodiment.

FIG. 3 illustrates a signaling flow between a UE and a gNB according to an embodiment. In FIG. 3, the SL grant can be for SL communication based on the LTE RAT or NR RAT.

For an activated serving cell, if the UE receives a PDCCH addressed to the SL-V-RNTI indicating SL grant, for the active DL BWP of this serving cell, the UE starts or restarts the bwp-InactivityTimer associated with the active DL BWP.

The UE is configured with one or more serving cells. For each activated serving cell, one or more BWPs are configured by the gNB using RRC signaling. There is one active DL BWP and UL BWP for each activated serving cell. A UE interested in V2X SL communication sends a signaling message (e.g. SidelinkUEInformation message) to request resources for V2X SL communication in step 310. The gNB assigns one or more SL-V-RNTIs to the UE and sends an RRC connection reconfiguration message including the assigned one or more SL-V-RNTIs to the UE in step 320. The gNB sends a PDCCH addressed to the SL-V-RNTI, and the UE monitors for the PDCCH addressed to the SL-V-RNTI in step 330. The PDCCH addressed to the SL-V-RNTI indicates an SL grant for V2X SL communication.

If the UE receives a PDCCH addressed to the SL-V-RNTI on an active DL BWP of a serving cell Y indicating an SL grant for a BWP of serving cell Z, the UE starts or restarts a bwp-InactivityTimer associated with the active DL BWP, which is configured with BWP ID Xl, of serving cell Z in step 340. This operation is performed if the default DL BWP is configured and the active DL BWP is not the default DL BWP, or if the default DL BWP is not configured and the active DL BWP is not the initial DL BWP.

Alternately, if the UE receives a PDCCH addressed to the SL-V-RNTI on an active DL BWP of a serving cell Y indicating an SL grant for a BWP of serving cell Z and serving cell Z is a TDD cell, the UE starts or restarts a bwp-InactivityTimer associated with the active DL BWP of serving cell Z. This operation is performed if the default DL BWP is configured and the active DL BWP is not the default DL BWP, or if the default DL BWP is not configured and the active DL BWP is not the initial DL BWP.

The above operation is also performed for a PDCCH addressed to the SL-SPS-V-RNTI. An NR gNB can configure the SL-SPS-V-RNTI separately for SL communication based on the LTE RAT and NR RAT. The above operation is also performed for a PDCCH addressed to the SL-SPS-V-RNTI for SL communication based on the LTE RAT or on the NR RAT.

Embodiment 4

Figure 4:
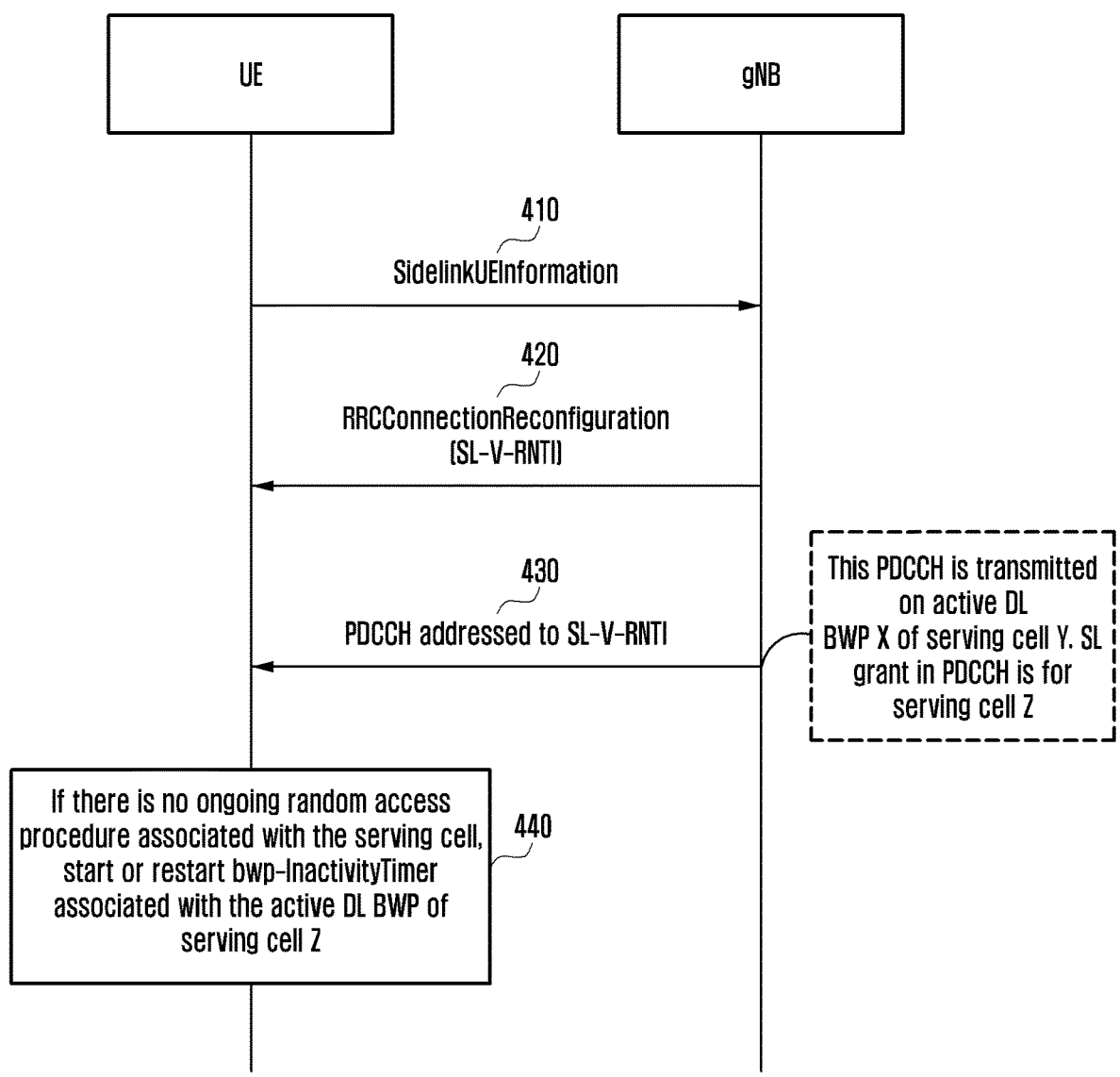
FIG. 4 illustrates a signaling flow between a UE and a gNB according to an embodiment.

FIG. 4 illustrates a signaling flow between a UE and a gNB according to an embodiment. In FIG. 4, the SL grant can be for SL communication based on the LTE RAT or NR RAT.

For an activated serving cell, if the UE receives a PDCCH addressed to the SL-V-RNTI indicating an SL grant, for the active DL BWP of this serving cell and there is no ongoing random access procedure associated with this serving cell, the UE starts or restarts the bwp-InactivityTimer associated with the active DL BWP.

The UE is configured with one or more serving cells. For each activated serving cell, one or more BWPs are configured by the gNB using RRC signaling. There is one active DL BWP and UL BWP for each activated serving cell. The UE interested in V2X SL communication sends a signaling message (e.g. SidelinkUEInformation message) to request resources for V2X SL communication to the gNB in step 410. The gNB assigns one or more SL-V-RNTIs to the UE and sends an RRC connection reconfiguration message including the assigned one or more SL-V-RNTIs to the UE in step 420. The gNB sends a PDCCH addressed to the SL-V-RNTI, and the UE monitors for the PDCCH addressed to the SL-V-RNTI in step 430. The PDCCH addressed to the SL-V-RNTI indicates an SL grant for V2X SL communication.

If the UE receives a PDCCH addressed to the SL-V-RNTI on an active DL BWP of a serving cell Y indicating an SL grant for a BWP of serving cell Z and there is no ongoing random access procedure associated with serving cell Z, the UE starts or restarts a bwp-InactivityTimer associated with the active DL BWP of serving cell Z in step 440. This operation is performed if the default DL BWP is configured and the active DL BWP is not the default DL BWP, or if the default DL BWP is not configured and the active DL BWP is not the initial DL BWP.

Alternately, if the UE receives a PDCCH addressed to the SL-V-RNTI on an active DL BWP of a serving cell Y indicating an SL grant for a BWP of serving cell Z and serving cell Z is a TDD cell and there is no ongoing random access procedure associated with serving cell Z, the UE starts or restarts a bwp-InactivityTimer associated with the active DL BWP of serving cell Z. This operation is performed if the default DL BWP is configured and the active DL BWP is not the default DL BWP or if the default DL BWP is not configured and the active DL BWP is not the initial DL BWP.

The above operation is also performed for a PDCCH addressed to the SL-SPS-V-RNTI. An NR gNB can configure the SL-SPS-V-RNTI separately for SL communication based on the LTE RAT and NR RAT. The above operation is also performed for a PDCCH addressed to SL-SPS-V-RNTI for SL communication based on the LTE RAT or on the NR RAT.

Embodiment 5

Figure 5:
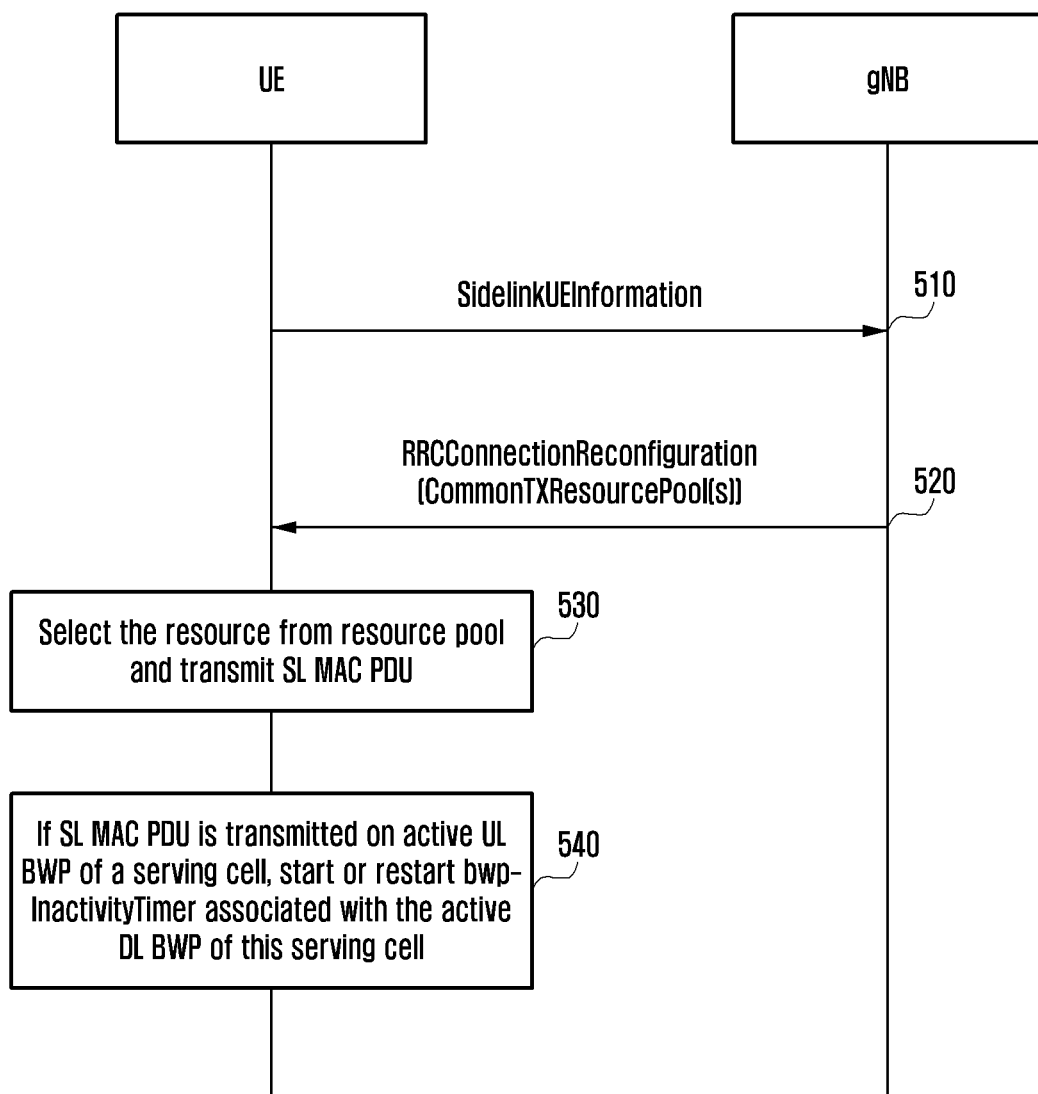
FIG. 5 illustrates a signaling flow between a UE and a gNB according to an embodiment.

FIG. 5 illustrates a signaling flow between a UE and a gNB according to an embodiment.

For an activated serving cell, if the UE transmits an SL MAC packet data unit (PDU) using autonomous SL resources (i.e. by selecting resources from common transmission (TX) resource pools randomly or based on sensing) on an active BWP of this serving cell, the UE starts or restarts the bwp-InactivityTimer associated with the active DL BWP of this serving cell.

The UE is configured with one or more serving cells. For each activated serving cell, one or more BWPs are configured by the gNB using RRC signaling. There is one active DL BWP and UL BWP for each activated serving cell. The UE interested in V2X SL communication sends a signaling message (e.g. SidelinkUEInformation message) to request resources for V2X SL communication to the gNB in step 510. The gNB assigns one or more common TX resource pools to the UE and sends an RRC connection reconfiguration message to the UE in step 520. The UE selects the resource from resource pool and transmits an SL MAC PDU in step 530. The gNB may also configure the SL SPS grants for V2X SL communication. The UE transmits an SL MAC PDU in SL SPS grants as well.

If the SL MAC PDU is transmitted on an active UL BWP of a serving cell, the UE starts or restarts a bwp-InactivityTimer associated with the active DL BWP of this serving cell in step 540. This operation is performed if the default DL BWP is configured and the active DL BWP is not the default DL BWP, or if the default DL BWP is not configured and the active DL BWP is not the initial DL BWP.

Alternately, if an SL MAC PDU is transmitted on an active UL BWP of a serving cell and serving cell is TDD cell, the UE starts or restarts a bwp-InactivityTimer associated with the active DL BWP of this serving cell. This operation is performed if the default DL BWP is configured and the active DL BWP is not the default DL BWP, or if the default DL BWP is not configured and the active DL BWP is not the initial DL BWP.

Embodiment 6

In an embodiment of the invention, for an activated serving cell, if the UE receives SL MAC PDU on an active BWP of this serving cell, the UE starts or restarts the bwp-InactivityTimer associated with the active DL BWP of this serving cell.

UE is configured with one or more serving cells. For each activated serving cell, one or more BWPs are configured by the gNB using RRC signaling. There is one active DL BWP and UL BWP for each activated serving cell.

If an SL MAC PDU is received on an active UL BWP of a serving cell, the UE starts or restarts a bwp-InactivityTimer associated with the active DL BWP of this serving cell. This operation is performed if the default DL BWP is configured and the active DL BWP is not the default DL BWP, or if the default DL BWP is not configured and the active DL BWP is not the initial DL BWP.

Alternately, if an SL MAC PDU is received on an active UL BWP of a serving cell and serving cell is TDD cell, the UE starts or restarts a bwp-InactivityTimer associated with the active DL BWP of this serving cell. This operation is performed if the default DL BWP is configured and the active DL BWP is not the default DL BWP, or if the default DL BWP is not configured and the active DL BWP is not the initial DL BWP.

2. Resource Allocation for V2X SL Communication

Embodiment 1

The UE is configured with one or more serving cells. For each activated serving cell, one or more BWPs are configured by the gNB using RRC signaling. There is one active DL BWP and one active UL BWP for each activated serving cell. The UE interested in V2X SL communication sends a signaling message (e.g. SidelinkUEInformation message) to request resources for V2X SL transmission. The UE indicates the one or more frequencies for V2X SL transmission and list of V2X SL transmission destination(s). For scheduled resource allocation, the gNB assigns one or more SL-V-RNTIs to the UE. The gNB also signals one or more v2x-SchedulingPools. Each v2x-SchedulingPool indicates a pool of Tx resources for V2X SL communications. In the current design, each signaled v2x-SchedulingPool is associated with a carrier frequency (serving or non-serving) used for V2X SL communication.

The gNB signals one or more v2x-SchedulingPools for one or more carrier frequencies for V2X SL communication or cells where each v2x-SchedulingPool is associated with an UL BWP. In other words, the gNB signals one or more v2x-SchedulingPools and for each scheduling pool indicates the associated carrier frequency (or cell list) and BWP information. The signaling of associated carrier frequency can be skipped for v2x-SchedulingPools associated with serving frequency (e.g. carrier frequency of special cell (SpCell)). For V2X SL transmission on one of the configured serving cells, a serving cell index can be used instead of carrier frequency information (i.e. absolute radio frequency channel number (ARFCN)). One example of signaling v2x-SchedulingPools associated with carrier frequency and BWP information is as follows:

EXAMPLE 1

List of BWPs is signaled by the gNB (e.g. in RRC Reconfiguration message). This list is per serving cell/frequency:
BWP configuration 1 (BWP ID, subcarrier spacing (SCS), location and bandwidth of this BWP, etc.)
BWP configuration 2 (BWP ID, SCS, location and bandwidth of this BWP, etc.)

BWP configuration 3 (BWP ID, SCS, location and bandwidth of this BWP, etc.)
and so on.
List of v2x-SchedulingPools is signaled (e.g. in RRC Reconfiguration message)
v2x-SchedulingPool 1: carrier frequency, BWP ID, v2x-SchedulingPool configuration parameters
v2x-SchedulingPool 2: carrier frequency, BWP ID, v2x-SchedulingPool configuration parameters
v2x-SchedulingPool 3: carrier frequency, BWP ID, v2x-SchedulingPool configuration parameters
and so on.

EXAMPLE 2

List of BWPs is signaled by the gNB (e.g. in RRC Reconfiguration message). This list is per serving cell/frequency:
BWP configuration 1 (BWP ID, SCS, location and bandwidth of this BWP, etc.)
BWP configuration 2 (BWP ID, SCS, location and bandwidth of this BWP, etc.)
BWP configuration 3 (BWP ID, SCS, location and bandwidth of this BWP, etc.)
and so on.
List of v2x-SchedulingPools is signaled per frequency
List of frequencies is signaled by the gNB (e.g. in RRC Reconfiguration message):
Carrier frequency 1
v2x-SchedulingPool 1: BWP ID, v2x-SchedulingPool configuration
v2x-SchedulingPool 2: BWP ID, v2x-SchedulingPool configuration
v2x-SchedulingPool 3: BWP ID, v2x-SchedulingPool configuration
and so on.
Carrier frequency 2
v2x-SchedulingPool 1: BWP ID, v2x-SchedulingPool configuration
v2x-SchedulingPool 2: BWP ID, v2x-SchedulingPool configuration
v2x-SchedulingPool 3: BWP ID, v2x-SchedulingPool configuration
and so on.
Carrier frequency 3
v2x-SchedulingPool 1: BWP ID, v2x-SchedulingPool configuration
v2x-SchedulingPool 2: BWP ID, v2x-SchedulingPool configuration
v2x-SchedulingPool 3: BWP ID, v2x-SchedulingPool configuration
and so on.
and so on.

After receiving the v2x-SchedulingPool(s) from gNB, the UE monitors for a PDCCH addressed to the SL-V-RNTI. The DCI in the PDCCH addressed to the SL-V-RNTI indicates an SL grant, i.e., Tx resources for V2X SL transmission. The DCI includes resource info which indicates a Tx resource allocated to the UE for V2X SL transmission. The Tx resource indicated in the PDCCH is one of Tx resources from the v2x-SchedulingPool. In case multiple v2x-SchedulingPools associated with different carrier frequencies are configured, the PDCCH indicates the carrier frequency associated with SL grant using a carrier indicator field (CIF). For inter-carrier scheduled resource allocation, CIF=1 in DCI corresponds to the first entry in this frequency list, CIF=2 corresponds to the second entry, and so on. CIF=0 in DCI corresponds to the frequency where the DCI is received. The Tx resource indicated in the PDCCH is one among the Tx resources from a v2x-SchedulingPool corresponding to a carrier frequency indicated by the CIF.

The DCI in the PDCCH addressed to the SL-V-RNTI also includes the BWP ID. The Tx resource indicated in the PDCCH is one among the Tx resources from the v2x-SchedulingPool wherein v2x-SchedulingPool corresponds to a carrier frequency indicated by a CIF and UL BWP indicated by a BWP ID field. The UE uses the received SL grant to transmit V2X SL transmission on the UL BWP identified by the BWP ID of the carrier frequency indicated by the CIF. One or more SL BWPs can be configured instead of using UL BWP for SL communication. This is in addition to DL and UL BWP. When two or more SL BWPs are configured, the PDCCH may include a BWP ID. The BWP ID included in the PDCCH indicates an SL BWP, wherein the v2x-SchedulingPool corresponds to the SL BWP. When only one SL BWP is configured, the PDCCH does not include a BWP ID and the Tx resource indicated in the PDCCH is one among the Tx resources from a v2x-SchedulingPool, wherein the v2x-SchedulingPool corresponds to SL BWP on a carrier frequency indicated by the CIF.

Upon receiving a PDCCH addressed to the SL-V-RNTI, the UE obtains a BWP ID and CIF from DCI of the received PDCCH. The UE determines a v2x-SchedulingPool corresponding to a carrier frequency indicated by the CIF and UL BWP indicated by a BWP ID field from one or more v2x-SchedulingPools configured by the gNB. The UE then uses the resource information in the DCI to identify the Tx resource from the determined v2x-SchedulingPool to be used for V2X SL transmission. The UE then performs V2X SL transmission on the UL BWP and carrier frequency indicated in the DCI.

Upon receiving a PDCCH addressed to the SL-V-RNTI, the UE obtains a BWP ID and CIF from DCI of the received PDCCH. The UE determines a v2x-SchedulingPool corresponding to a carrier frequency indicated by the CIF and SL BWP indicated by BWP ID field from one or more v2x-SchedulingPools configured by the gNB. The UE then uses the resource information in the DCI to identify the Tx resource from the determined v2x-SchedulingPool to be used for V2X SL transmission, and performs V2X SL transmission on SL BWP of the carrier frequency indicated in the DCI. Note that the BWP ID can be skipped in the DCI if there is only one SL BWP per frequency.

If the carrier frequency for V2X SL transmission corresponds to the received SL grant corresponds to one of the activated serving cells and the active UL BWP is not identical to the UL BWP of received SL grant and the UE cannot operate on multiple BWPs simultaneously, the UE switches the active UL BWP to the UL BWP of the received SL grant and performs the V2X SL transmission.

Figure 6:
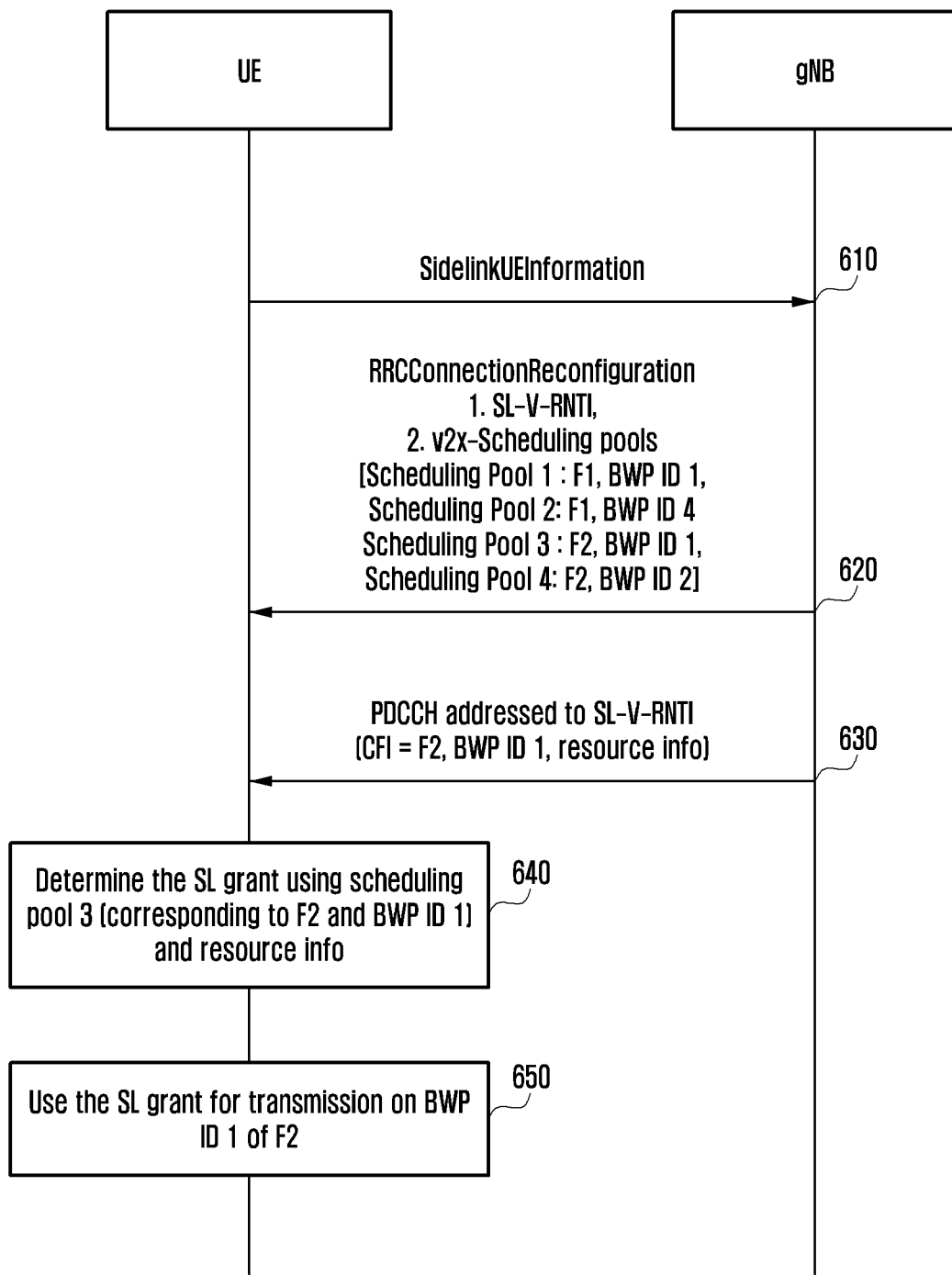
FIG. 6 illustrates procedures for resource allocation of V2X sidelink communication according to an embodiment.

FIG. 6 illustrates procedures for resource allocation of V2X SL communication according to an embodiment.

Referring to FIG. 6, the UE interested in V2X SL communication sends a signaling message (e.g. SidelinkUEInformation message) to request resources for V2X SL transmission to the gNB in step 610. In response to the UE's request for V2X SL transmission resources, the gNB signals an SL-V-RNTI and four (4) v2x-SchedulingPools in step 620. The v2x-SchedulingPool 1 is associated with carrier frequency F1 and a UL BWP with BWP ID 1. The v2x-SchedulingPool 2 is associated with carrier frequency F1 and a UL BWP with BWP ID 4. The v2x-SchedulingPool 3 is associated with carrier frequency F2 and a UL BWP with BWP ID 1. The v2x-SchedulingPool 4 is associated with carrier frequency F2 and a UL BWP with BWP ID 2.

After receiving the v2x-SchedulingPools from gNB, the UE monitors for a PDCCH addressed to the SL-V-RNTI. The UE receives a PDCCH addressed to the SL-V-RNTI in step 630. If the DCI indicates that an SL grant is for F2 and UL BWP 1, the UE then uses the resource information in the DCI to identify the Tx resource from the determined v2x-SchedulingPool 3 to be used for V2X SL transmission in step 640. The UE then performs V2X SL transmission based on the received SL grant on UL BWP 1 of the carrier frequency F2 in step 650. One or more SL BWPs can be configured for SL communication instead of using a UL BWP for SL communication. In this case the procedure is applied by replacing 'UL BWP' with 'SL BWP'.

In response to the UE's request for V2X SL transmission resources, the gNB signals SL-V-RNTI and 4 v2x-SchedulingPools. The v2x-SchedulingPool 1 is associated with carrier frequency F1 and an SL BWP with BWP ID 1. The v2x-SchedulingPool 2 is associated with carrier frequency F1 and an SL BWP with BWP ID 4. The v2x-SchedulingPool 3 is associated with carrier frequency F2 and an SL BWP with BWP ID 1. The v2x-SchedulingPool 4 is associated with carrier frequency F2 and an SL BWP with BWP ID 2.

After receiving the v2x-SchedulingPools from gNB, the UE monitors for a PDCCH addressed to the SL-V-RNTI. The UE receives a PDCCH addressed to the SL-V-RNTI. The DCI indicates that an SL grant is for F2 and SL BWP 1. The UE then uses the resource information in the DCI to identify the Tx resource from the determined v2x-SchedulingPool 3 to be used for V2X SL transmission. The UE then performs V2X SL transmission based on received SL grant on SL BWP 1 of the carrier frequency F2.

Figure 7:
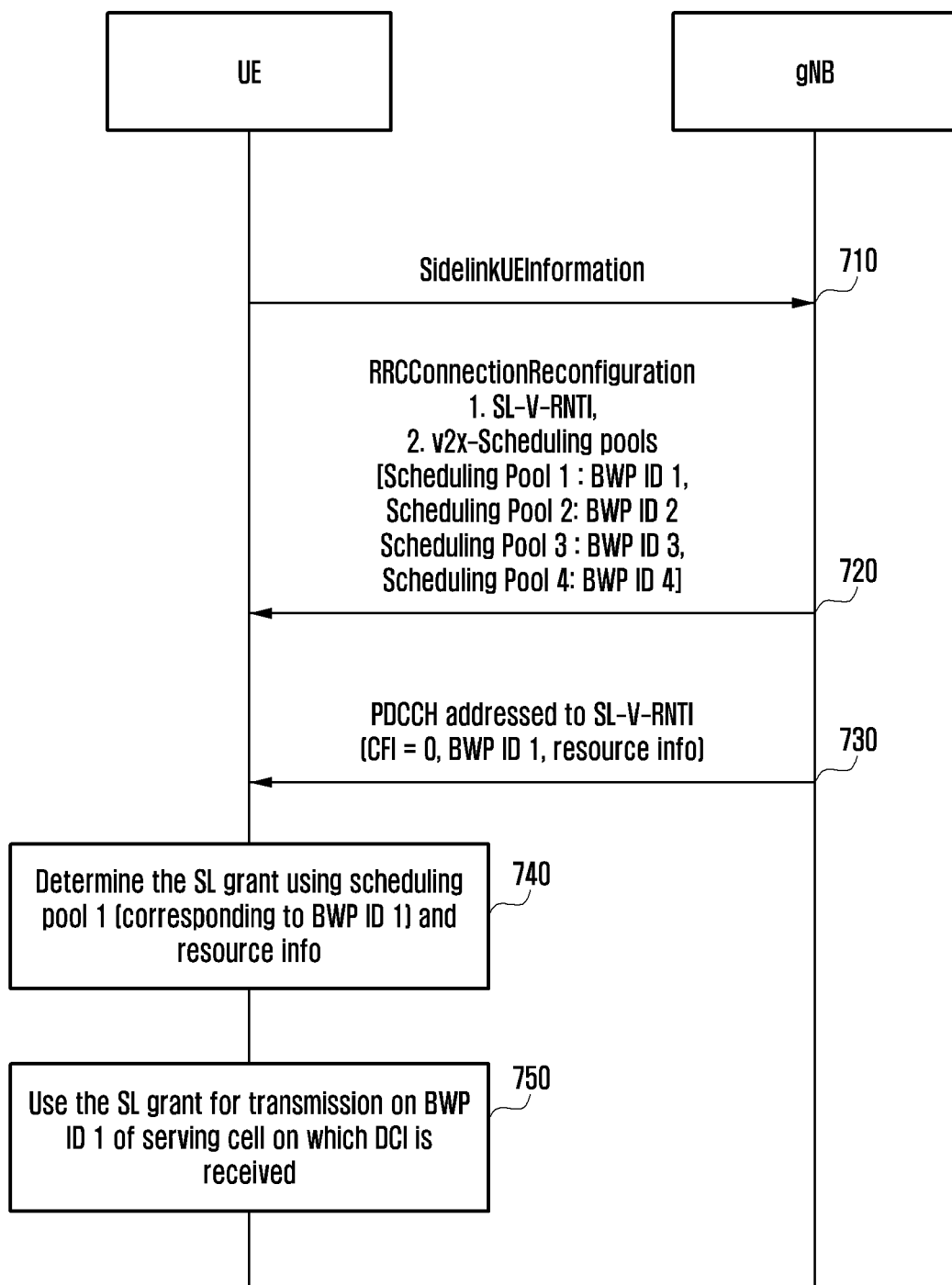
FIG. 7 illustrates another example of procedures for resource allocation of V2X sidelink communication according to an embodiment.

FIG. 7 illustrates another example of procedures for resource allocation of V2X SL communication according to an embodiment.

Referring to FIG. 7, the UE interested in V2X SL communication sends a signaling message (e.g. SidelinkUEInformation message) to request resources for V2X SL transmission in step 710. In response to the UE's request for V2X SL transmission resources, the gNB signals SL-V-RNTI and four (4) v2x-SchedulingPools for a carrier frequency of one of serving cells in step 720. The v2x-SchedulingPool 1 is associated a UL BWP with BWP ID 1. The v2x-SchedulingPool 2 is associated with a UL BWP with BWP ID 2. The v2x-SchedulingPool 3 is associated with a UL BWP with BWP ID 3. The v2x-SchedulingPool 4 is associated with a UL BWP with BWP ID 4.

After receiving the v2x-SchedulingPools from the gNB, the UE monitors for a PDCCH addressed to the SL-V-RNTI. The UE receives a PDCCH addressed to the SL-V-RNTI from the gNB in step 730. The DCI is received on a carrier frequency for which v2x-SchedulingPools are configured. If DCI indicates that the SL grant is for UL BWP 1, the UE then uses the resource information in the DCI to identify the Tx resource from the determined v2x-SchedulingPool 1 to be used for V2X SL transmission in step 740. The UE then performs V2X SL transmission based on the received SL grant on UL BWP 1 of the carrier frequency on which the DCI was received in step 750.

One or more SL BWPs can be configured for SL communication instead of using a UL BWP for SL communication. In this case, the procedure is applied by replacing 'UL BWP' with 'SL BWP'. In response to the UE's request for V2X SL transmission resources, the gNB signals an SL-V-RNTI and 4 v2x-SchedulingPools for a carrier frequency of one of serving cells. The v2x-SchedulingPool 1 is associated with an SL BWP with BWP ID 1. The v2x-SchedulingPool 2 is associated with an SL BWP with BWP ID 2. The v2x-SchedulingPool 3 is associated with an SL BWP with BWP ID 3. The v2x-SchedulingPool 4 is associated with an SL BWP with BWP ID 4. After receiving the v2x-SchedulingPools from gNB, the UE monitors for a PDCCH addressed to the SL-V-RNTI. The UE receives a PDCCH addressed to the SL-V-RNTI. The DCI is received on a carrier frequency for which v2x-SchedulingPools are configured and indicates that an SL grant is for an SL BWP 1. The UE then uses the resource information in the DCI to identify the Tx resource from the determined v2x-SchedulingPool 1 to be used for V2X SL transmission. The UE then performs V2X SL transmission based on the received SL grant on SL BWP 1 of the carrier frequency on which the DCI was received.

Embodiment 2

The UE is configured with one or more serving cells. For each activated serving cell, one or more BWPs are configured by the gNB using RRC signaling. There is one active DL BWP and one active UL BWP for each activated serving cell. The UE interested in V2X SL communication sends a signaling message (e.g. SidelinkUEInformation message) to request resources for V2X SL transmission. The UE indicates the one or more frequencies for V2X SL transmission and a list of V2X SL transmission destination(s). For scheduled resource allocation, the gNB assigns one or more SL-V-RNTIs to the UE. The gNB also signals one or more v2x-SchedulingPools, where each v2x-SchedulingPool indicates a pool of Tx resources for V2X SL communications. In the current design, each signaled v2x-SchedulingPool is associated with a carrier frequency (serving or non-serving) used for V2X SL communication.

After receiving the v2x-SchedulingPool from gNB, the UE monitors for a PDCCH addressed to the SL-V-RNTI. The DCI in the PDCCH addressed to the SL-V-RNTI indicates an SL grant, i.e., Tx resource for V2X SL communication. The DCI includes resource info which indicates the Tx resource assigned to the UE for V2X SL transmission. The Tx resource indicated in the PDCCH is one of Tx resources from v2x-SchedulingPool. In case multiple v2x-SchedulingPools associated with different carrier frequencies are configured, PDCCH indicates the carrier frequency associated with SL grant using CIF. For inter-carrier scheduled resource allocation, CIF=1 in the DCI corresponds to the first entry in this frequency list, CIF=2 corresponds to the second entry, and so on. CIF=0 in the DCI corresponds to the frequency where the DCI is received. The Tx resource indicated in the PDCCH is one among the Tx resources from v2x-SchedulingPool corresponding to frequency indicated by the CIF.

In an embodiment of the disclosure, DCI in the PDCCH addressed to the SL-V-RNTI also includes the BWP ID. The Tx resource indicated in the PDCCH is one among Tx resources from v2x-SchedulingPool corresponding to a carrier frequency indicated by the CIF. The UE will use the received SL grant to transmit V2X SL transmission on UL BWP identified by BWP ID of the carrier frequency indicated by the CIF. It is to be noted that one or more SL BWPs can be configured for SL communication instead of using UL BWP for SL communication. The UE will use the received SL grant to transmit V2X SL transmission on SL BWP identified by BWP ID of the carrier frequency indicated by the CIF.

Upon receiving a PDCCH addressed to the SL-V-RNTI, the UE obtains a BWP ID and CIF from DCI of the received PDCCH. The UE determines a v2x-SchedulingPool corresponding to a carrier frequency indicated by the CIF from one or more v2x-SchedulingPools configured by the gNB. The UE then uses the resource information in the DCI to identify the Tx resource from the determined v2x-SchedulingPool to be used for V2X SL transmission. The UE then performs V2X SL transmission on UL BWP and carrier frequency indicated in the DCI. It is to be noted that one or more SL BWPs can be configured for SL communication instead of using UL BWP for SL communication. In this case BWP ID in the DCI refers to SL BWP. The UE will use the received SL grant to transmit V2X SL transmission on SL BWP identified by BWP ID of the carrier frequency indicated by the CIF.

If the carrier frequency for V2X SL transmission corresponding to the received SL grant corresponds to one of the activated serving cells and the active UL BWP is not identical to UL BWP of received SL grant and the UE cannot operate on multiple BWP simultaneously, the UE switches the active UL BWP to UL BWP of the received SL grant and performs the V2X SL transmission.

Figure 8:
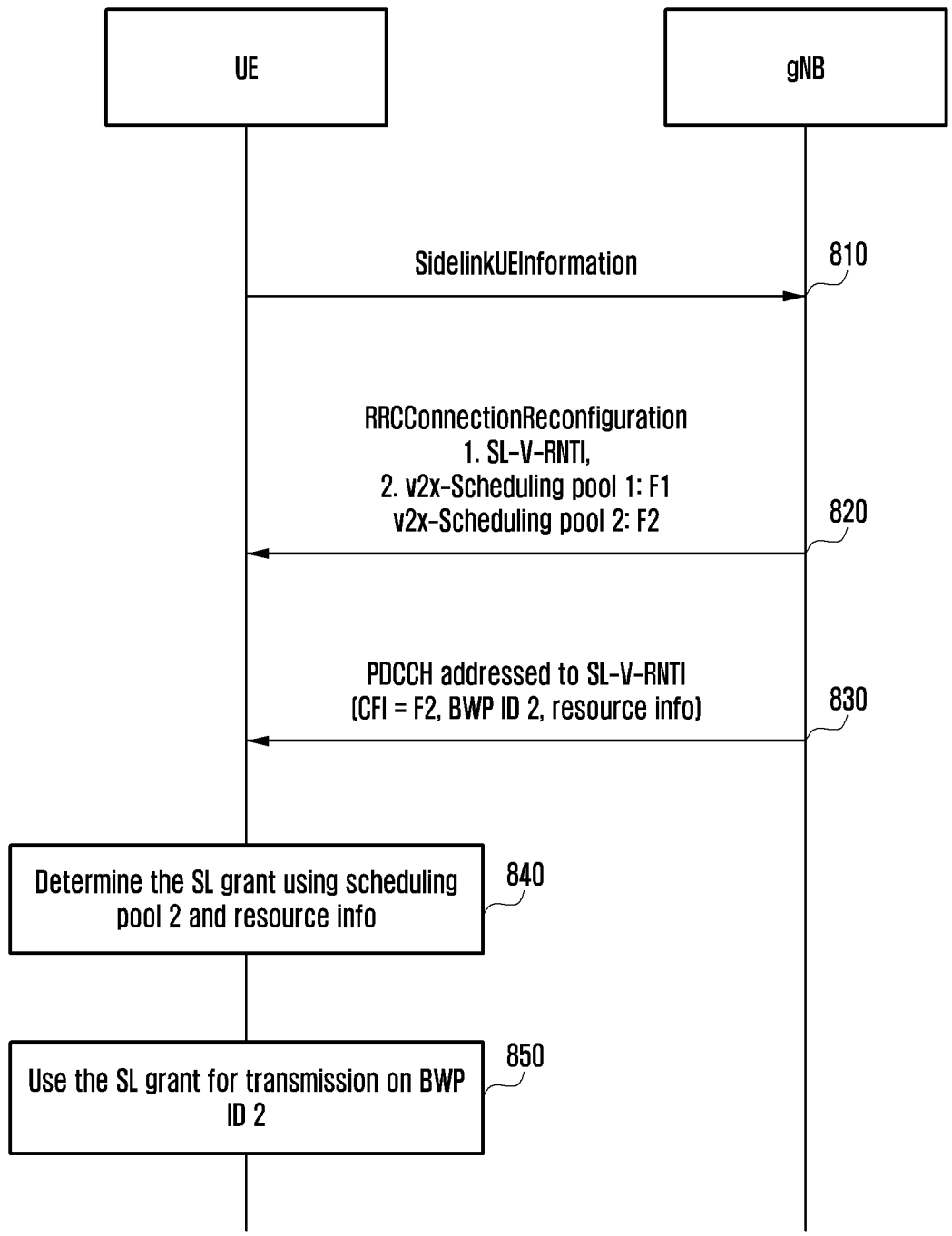
FIG. 8 illustrates procedures for resource allocation of V2X sidelink communication according to an embodiment.

FIG. 8 illustrates procedures for resource allocation of V2X SL communication according to an embodiment.

Referring to FIG. 8, the UE interested in V2X SL communication sends a signaling message (e.g. SidelinkUEInformation message) to request resources for V2X SL transmission in step 810. In response to the UE's request for V2X SL transmission resources, gNB signals SL-V-RNTI and two (2) v2x-SchedulingPools in step 820. The v2x-SchedulingPool 1 is associated with carrier frequency F1. The v2x-SchedulingPool 2 is associated with carrier frequency F2. After receiving the v2x-SchedulingPools from gNB, the UE monitors for a PDCCH addressed to the SL-V-RNTI. The UE receives a PDCCH addressed to the SL-V-RNTI in step 830. If the DCI indicates that SL grant is for F2 and UL BWP 2, the UE then uses the resource information in the DCI to identify the Tx resource from the v2x-SchedulingPool 2 corresponding to a carrier frequency F2 indicated in the DCI in step 840. The UE then performs V2X SL transmission based on the received SL grant on UL BWP 2 (indicated in the DCI) of the carrier frequency F2 (indicated in the DCI) in step 850. It is to be noted that one or more SL BWPs can be configured for SL communication instead of using UL BWP for SL communication. In this case the procedure is applied by replacing 'UL BWP' with 'SL BWP'. In response to the UE's request for V2X SL transmission resources, gNB signals SL-V-RNTI and two (2) v2x-SchedulingPools in step 820. The v2x-SchedulingPool 1 is associated with carrier frequency F1. The v2x-SchedulingPool 2 is associated with carrier frequency F2. After receiving the v2x-SchedulingPools from gNB, the UE monitors for a PDCCH addressed to the SL-V-RNTI. The UE receives a PDCCH addressed to the SL-V-RNTI in step 830. If the DCI indicates that SL grant is for F2 and SL BWP 2, the UE then uses the resource information in the DCI to identify the Tx resource from the v2x-SchedulingPool 2 corresponding to a carrier frequency F2 indicated in the DCI in step 840. The UE then performs V2X SL transmission based on the received SL grant on SL BWP 2 (indicated in the DCI) of the carrier frequency F2 (indicated in the DCI) in step 850.

Embodiment 3

UE is configured with one or more serving cells. For each activated serving cell, one or more BWPs are configured by the gNB using RRC signaling. There is one active DL BWP and one active UL BWP for each activated serving cell. The UE interested in V2X SL communication sends a signaling message (e.g. SidelinkUEInformation message) to request resources for V2X SL transmission. The UE indicates the one or more frequencies for V2X SL transmission and list of V2X SL transmission destination(s). For scheduled resource allocation, gNB assigns one or more SL-V-RNTIs to the UE. The gNB also signals one or more v2x-SchedulingPools, where each v2x-SchedulingPool indicates a pool of Tx resources for V2X SL communications. In the current design, each signaled v2x-SchedulingPool is associated with a carrier frequency used for V2X SL communication.

The v2x-SchedulingPools signaled by the gNB are also associated with UL BWPs. For each carrier frequency, there is at most one v2x-SchedulingPool and each v2x-SchedulingPool is associated with a UL BWP. The associated UL BWP is signaled by the gNB. The difference between this Embodiment 3 and Embodiment 1 described above is that in Embodiment 1, for each carrier frequency, multiple v2x-SchedulingPools can be configured where each is associated with a different UL BWP. It is to be noted that one or more SL BWPs can be configured for SL communication instead of using a UL BWP for SL communication. In this case, v2x-SchedulingPools signaled by the gNB are also associated with SL BWPs. For each carrier frequency, there is at most one v2x-SchedulingPool and each v2x-SchedulingPool is associated with an SL BWP. The associated SL BWP is signaled by the gNB. The difference between this Embodiment 3 and Embodiment 1 described above is that in Embodiment 1, for each carrier frequency multiple v2x-SchedulingPools can be configured where each is associated with a different SL BWP.

After receiving the v2x-SchedulingPool from gNB, the UE monitors for a PDCCH addressed to the SL-V-RNTI. The DCI in the PDCCH addressed to the SL-V-RNTI indicates an SL grant, i.e., Tx resource for V2X SL communication. The DCI includes resource info which indicates the Tx resource assigned to the UE for V2X SL communication. The Tx resource indicated in the PDCCH is one among the Tx resources from the v2x-SchedulingPool. When multiple v2x-SchedulingPools associated with different carrier frequencies are configured, PDCCH indicates the carrier frequency associated with the SL grant using a CIF. For inter-carrier scheduled resource allocation, CIF=1 in the DCI corresponds to the first entry in this frequency list, CIF=2 corresponds to the second entry, and so on. CIF=0 in the DCI corresponds to the frequency where the DCI is received. The Tx resource indicated in the PDCCH is one of Tx resources from v2x-SchedulingPool corresponding to frequency indicated by the CIF.

Upon receiving a PDCCH addressed to the SL-V-RNTI, the UE obtains CIF from DCI of the received PDCCH. The UE determines a v2x-SchedulingPool corresponding to a carrier frequency indicated by the CIF from one or more v2x-SchedulingPools configured by the gNB. The UE then uses the resource information in the DCI to identify the Tx resource from the determined v2x-SchedulingPool to be used for V2X SL transmission. The UE then performs V2X SL transmission on a UL BWP associated with the determined v2x-SchedulingPool. It is to be noted that one or more SL BWPs can be configured for SL communication instead of using the UL BWP for SL communication. In this case, the UE performs V2X SL transmission on SL BWP associated with the determined v2x-SchedulingPool.

If the carrier frequency for V2X SL transmission corresponding to the received SL grant corresponds to one of the activated serving cells and the active UL BWP is not identical to UL BWP of received SL grant and the UE cannot operate on multiple BWPs simultaneously, the UE switches the active UL BWP to a UL BWP of the received SL grant and performs the V2X SL transmission.

Figure 9:
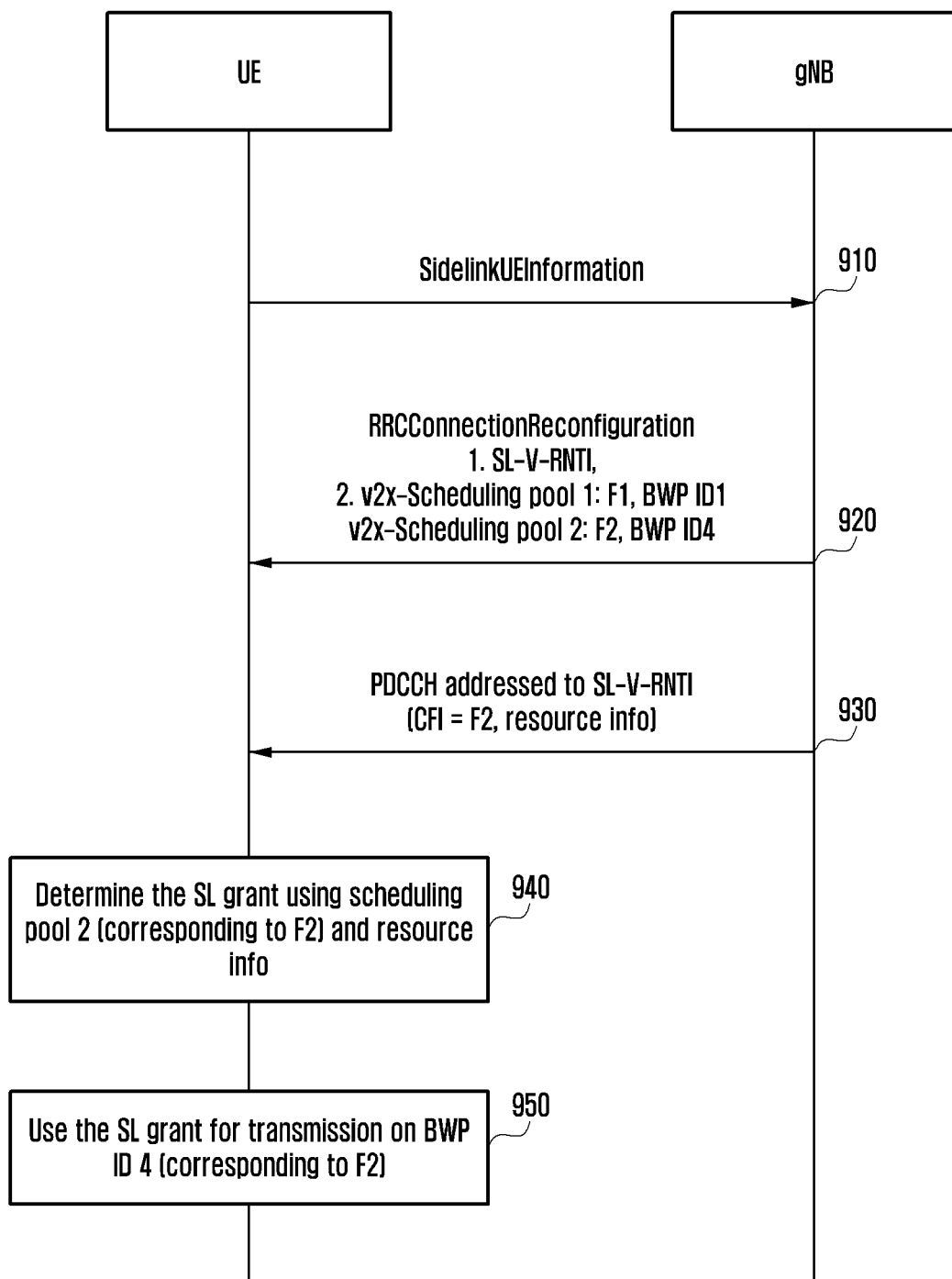
FIG. 9 illustrates procedures for resource allocation of V2X sidelink communication according to an embodiment.

FIG. 9 illustrates procedures for resource allocation of V2X SL communication according to an embodiment.

Referring to FIG. 9, the UE interested in V2X SL communication sends a signaling message (e.g. SidelinkUEInformation message) to request resources for V2X SL transmission to the gNB in step 910. In response to the UE's request for V2X SL transmission resources, the gNB sends SL-V-RNTI and two (2) v2x-SchedulingPools to the UE in step 920. The v2x-SchedulingPool 1 is associated with carrier frequency F1 and a UL BWP with BWP ID 1. The v2x-SchedulingPool 2 is associated with carrier frequency F2 and a UL BWP with BWP ID 4.

After receiving the v2x-SchedulingPools from the gNB, the UE monitors for a PDCCH addressed to the SL-V-RNTI. The UE receives a PDCCH addressed to the SL-V-RNTI in step 930. If the DCI indicates that SL grant is for F2, the UE then uses the resource information in the DCI to identify the scheduling assignment (SA), which also refers to 'scheduling control,' and data resources from the determined v2x-SchedulingPool 2 (corresponding to a carrier frequency F2) to be used for V2X SL transmission in step 940. The UE then performs V2X SL transmission based on the received SL grant on UL BWP 4 of the carrier frequency F2 in step 950. One or more SL BWPs can be configured for SL communication instead of using a UL BWP for SL communication. In this case, the procedure is applied by replacing a 'UL BWP' with 'SL BWP'. The UE interested in V2X SL communication sends a signaling message (e.g. SidelinkUE-Information message) to request resources for V2X SL transmission in step 910. In response to the UE's request for V2X SL transmission resources, the gNB sends an SL-V-RNTI and two (2) v2x-SchedulingPools to the UE in step 920. The v2x-SchedulingPool 1 is associated with carrier frequency F1 and an SL BWP with BWP ID 1. The v2x-SchedulingPool 2 is associated with carrier frequency F2 and an SL BWP with BWP ID 4.

After receiving the v2x-SchedulingPools from the gNB, the UE monitors for a PDCCH addressed to the SL-V-RNTI. The UE receives a PDCCH addressed to the SL-V-RNTI in step 930. If the DCI indicates that the SL grant is for F2, the UE then uses the resource information in the DCI to identify the SA and data resources from the determined v2x-SchedulingPool 2 (corresponding to a carrier frequency F2) to be used for V2X SL transmission in step 940. The UE then performs V2X SL transmission based on the received SL grant on UL BWP 4 of the carrier frequency F2 in step 950.

Mapping Between PDCCH Monitoring Occasion in SI Window and SSBs

In the 5G wireless communication system, system information is divided into minimum SI (comprising of MIB and SIB1) and other SI (SIB 2, SIB 3 and so on). SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI windows with same lengths for all SI messages). Each SI message is associated with an SI window and the SI windows of different SI messages do not overlap. That is, within one SI window only the corresponding SI message is transmitted. A scheduling-InfoList in si-SchedulingInfo in SIB1 includes a list of SI messages transmitted by the gNB. SIB1 indicates the mapping between SIBs and SI messages, and the periodicity of each transmitted SI message and length of the SI window.

In NR, a cluster of SI windows (each of equal length) occurs periodically (at smallest SI period amongst all the SI periods).

Figure 10:
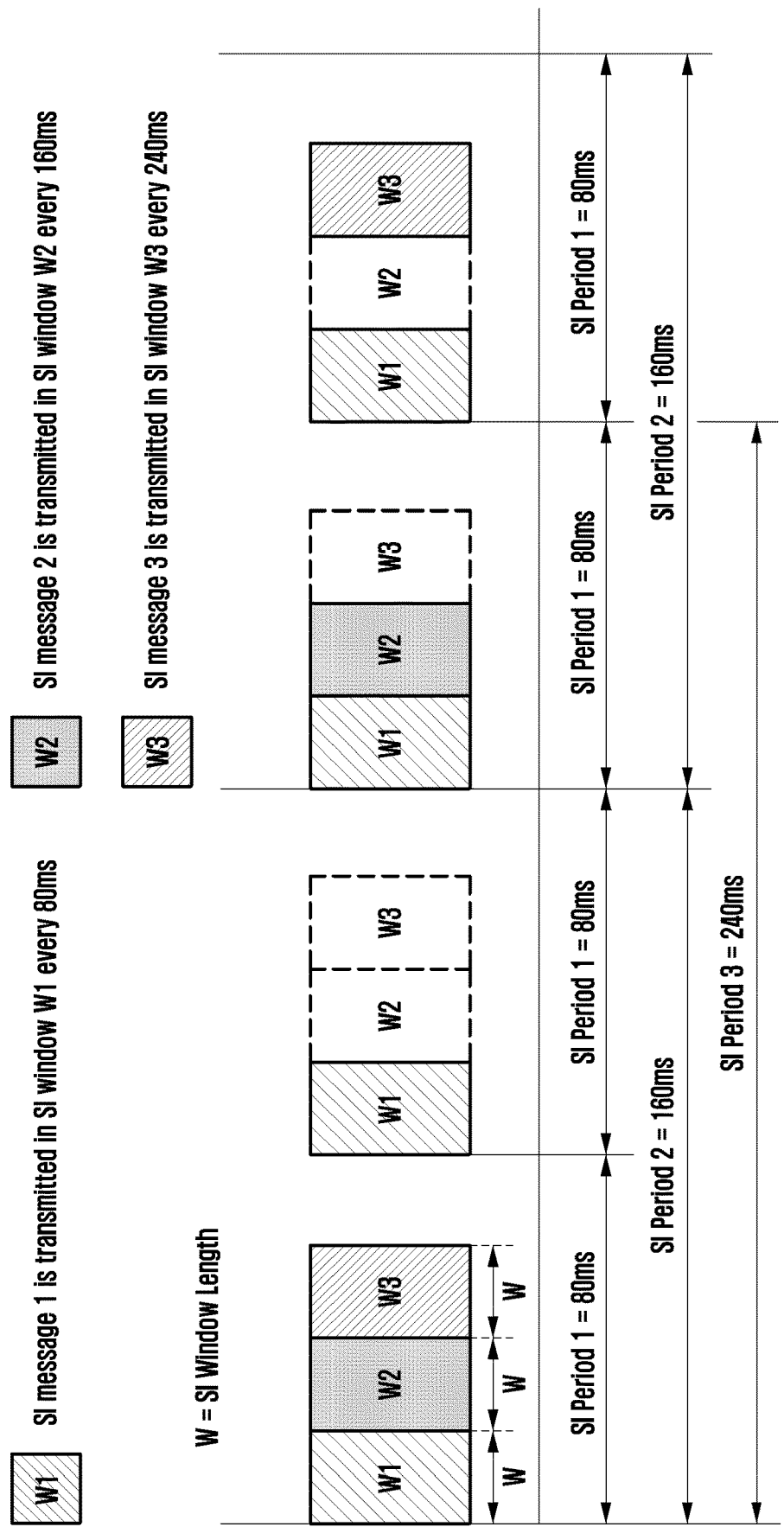
FIG. 10 illustrates a cluster of SI-windows occurring periodically for a cell transmitting 3 SI messages.

FIG. 10 illustrates a cluster of SI-windows occurring periodically for a cell transmitting 3 SI messages.

Referring to FIG. 10, a cell transmits 3 SI messages (i.e., schedulingInfoList in si-SchedulingInfo in SIB1 includes a list of 3 SI messages) wherein SI message 1 has an SI periodicity of 80 ms, SI message 2 has an SI periodicity of 160 ms and SI message 3 has periodicity of 240 ms. SI message 1 is mapped to SI window number 1. SI message 2 is mapped to SI window number 2 and SI message 3 is mapped to SI window number 3. For an SI message, SI window number is the order of entry in the list of SI messages configured by schedulingInfoList in si-SchedulingInfo in SIB1.

For acquiring an SI message, the UE determines the location of SI windows of that SI message as follows: SI window for an SI message starts at the slot #a, where a=x mod N, in the radio frame for which SFN mod T=FLOOR (x/N), where T is the si-Periodicity of the SI message and N is the number of slots in a radio frame and x=(n1)*w, where w is the SI windowLength and n is the SI window number. For an SI message, SI window number is the order of entry in the list of SI messages configured by schedulingInfoList in si-SchedulingInfo in SIB1.

For acquiring the SI message, in the SI window of that SI message, the UE monitors the PDCCH monitoring occasions (i.e. symbols/slots) configured for SI message reception. For SI message acquisition, PDCCH monitoring occasion(s) are determined according to osi-searchSpace. There can be one or more DL bandwidth parts in a cell. For SI message(s) reception in a DL BWP, osi-searchSpace is signaled by the gNB in a DL BWP configuration of that BWP. For an initial DL BWP, osi-searchSpace is signaled in an SIB1 and dedicated RRC signaling. For other dedicated DL BWPs, osi-searchSpace is signaled in dedicated RRC signaling.

If osi-searchSpace is set to zero (also referred as default association), PDCCH monitoring occasions for SI message reception in SI window are identical to PDCCH monitoring occasions for SIB 1. PDCCH monitoring occasions for SIB1 are indicated using the parameters search space zero and control resource set (coreset) zero in MIB. If osi-searchSpace is not set to zero (also referred as non-default association), PDCCH monitoring occasions for SI message is determined based on a search space configuration indicated by osi-searchSpace.

The search space configuration indicated by osi-searchSpace comprises of parameters Monitoring-periodicity-PDCCH-slot, Monitoring-offset-PDCCH-slot, Monitoring-symbols-PDCCH-within-slot and duration. A UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. PDCCH monitoring occasions are in slots 'x' to x+duration where the slot with number 'x' in a radio frame with number 'y' satisfies the following Equation (1):

$$(y*(\text{number of slots in a radio frame})+x-\text{Monitoring-offset-PDCCH-slot}) \bmod (\text{Monitoring-periodicity-PDCCH-slot})=0; \quad (1)$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the coreset associated with the search space. Based on search space configuration indicated by osi-searchSpace (comprising of parameters Monitoring-periodicity-PDCCH-slot, Monitoring-offset-PDCCH-slot, Monitoring-symbols-PDCCH-within-slot and duration), the UE can determine the PDCCH monitoring occasions for SI message reception in the SI window.

In a TDD cell, a UE receives TDD configuration using at least one of tdd-UL-DL-ConfigurationCommon IE, tdd-UL-DL-ConfigurationDedicated IE and group common PDCCH. tdd-UL-DL-ConfigurationCommon IE is signaled in system information and indicates DL symbols, UL symbols and flexible symbols. tdd-UL-DL-ConfigurationDedicated IE is signaled in dedicated RRC signaling and indicates which of the flexible symbols are UL symbols. Group common PDCCH provides TDD configuration for one or more slots. Among the PDCCH monitoring occasions signaled by osi-searchSpace, the UE excludes those PDCCH monitoring occasion(s) which are overlapping with UL symbol(s). The UL symbol(s) are determined according to tdd-UL-DL-ConfigurationCommon. Note that exclusion of monitoring occasions which are overlapping with UL symbols determined according to tdd-UL-DL-ConfigurationCommon parameter is performed only in a TDD cell when an FDD cell tdd-UL-DL-ConfigurationCommon is not signaled.

Each PDCCH monitoring occasion for SI message reception in an SI window is associated with one of the transmitted SSBs (or SS/PBCH blocks). Based on this association a UE can determine a PDCCH monitoring occasion corresponding to one or more suitable SSBs (e.g. SSB with SS-RSRP above a threshold) and monitor only these PDCCH monitoring occasions in the SI window. In the existing system, $K^{th}$ PDCCH monitoring occasion for SI message reception in an SI window corresponds to $K^{th}$ transmitted SSB. However, this mapping rule between PDCCH monitoring occasions for SI message reception in the SI window and transmitted SSBs works only if the number of PDCCH monitoring occasions for SI message reception in an SI window is equal to the number of transmitted SSBs. However, depending on the length of the SI window and OSI search space configuration, the number of PDCCH monitoring occasions for SI message reception in the SI window can be greater than the number of transmitted SSBs. Thus, an enhanced mapping rule between PDCCH monitoring occasions in the SI window and transmitted SSBs is needed.

There are up to 64 SSBs and each SSB is uniquely identified by an SSB identifier. The parameter ssb-PositionsInBurst in SystemInformationBlock 1 indicates which SSBs are transmitted by the gNB. ssb-PositionsInBurst is a bitmap. The first/leftmost bit in ssb-PositionsInBurst corresponds to SS/PBCH block index 0, the second bit corresponds to SS/PBCH block index 1, and so on. Value 0 in the bitmap indicates that the corresponding SS/PBCH block is not transmitted while value 1 indicates that the corresponding SS/PBCH block is transmitted. The PDCCH monitoring occasions for paging which are not overlapping with UL symbols (UL symbols are determined according to tdd-UL-DL-ConfigurationCommon parameter signaled in SIB1) are sequentially numbered from one in the SI window. The valid PDCCH monitoring occasions in the SI window are sequentially numbered from 1 in the SI window. These numbered PDCCH monitoring occasions are then mapped to SSBs as follows:

First embodiment: $(x*N+K)^{th}$ PDCCH monitoring occasion(s) in the SI window corresponds to $K^{th}$ transmitted SSB N is the number of transmitted SSBs. K=1, 2, . . . N;

x=0, 1, . . . X−1; X=(Number of PDCCH monitoring occasions in SI Window/N). Note X is rounded up to the nearest integer having a greater than or equal value if the division (Number of PDCCH monitoring occasions in SI Window/N) is not an integer.

Note that the actual transmitted SSBs are sequentially numbered from 1 to N in ascending order of their SSB Indices. For example, presuming that ssb-PositionsInBurst indicates that SSB Index 4, SSB Index 8, SSB Index 14 and SSB Index 16 are transmitted by the gNB, K equals 1 for SSB with SSB Index 4, K equals 2 for SSB with SSB Index 8, K equals 3 for SSB with SSB index 14, and K equals 4 for SSB with SSB Index 16.

Figure 11:
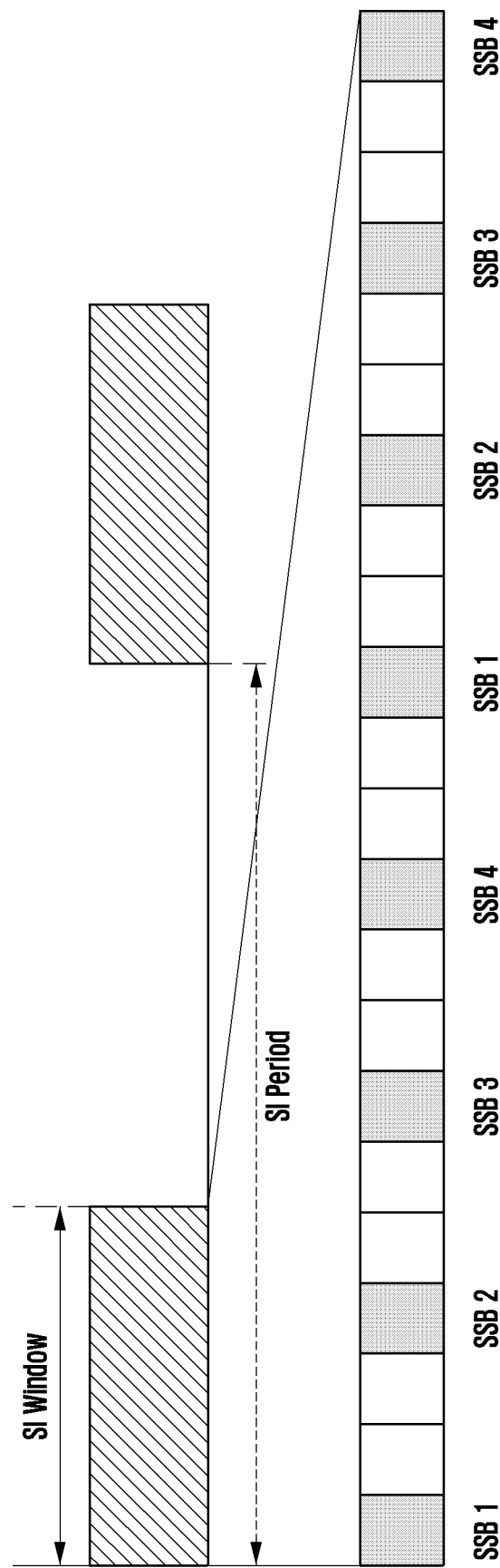
FIG. 11 illustrates mapping between PDCCH monitoring occasions for SI message reception and SSBs according to a first embodiment.

FIG. 11 illustrates mapping between PDCCH monitoring occasions for SI message reception and SSBs according to a first embodiment. There are 4 transmitted SSBs and the number of PDCCH monitoring occasions in the SI window is 8. SSB 1 (i.e. SSB corresponding to K equals 1) is mapped to 1st (0*4+1) and 5th (1*4+1) PDCCH monitoring occasions. SSB 2 (i.e. SSB corresponding to K equals 2) is mapped to 2nd (0*4+2) and 6th (1*4+2) PDCCH monitoring occasions. SSB 3 (i.e. SSB corresponding to K equals 3) is mapped to 3rd (0*4+3) and 7th (1*4+3) PDCCH monitoring occasions. SSB 4 (i.e. SSB corresponding to K equals 4) is mapped to 4th (0*4+4) and 8th (1*4+4) PDCCH monitoring occasions.

Second embodiment: $((K-1)*X+x)$th PDCCH monitoring occasion(s) in an SI window corresponds to a Kth transmitted SSB N is the number of transmitted SSBs. K=1, 2, . . . N;

x=1, 2 . . . , X; X=(Number of PDCCH monitoring occasions in SI Window/N). Note X is rounded up to nearest integer having a greater than or equal value if the division (Number of PDCCH monitoring occasions in SI Window/N) is not an integer.

Note that the actual transmitted SSBs are sequentially numbered from 1 to N in ascending order of their SSB Indices. For example, presuming a ssb-PositionsInBurst indicates that SSB Index 4, SSB Index 8, SSB Index 14 and SSB Index 16 are transmitted by the gNB. As such, K equals 1 for SSB with SSB Index 4, K equals 2 for SSB with SSB Index 8, K equals 3 for SSB with SSB index 14 and K equals 4 for SSB with SSB Index 16.

Figure 12:
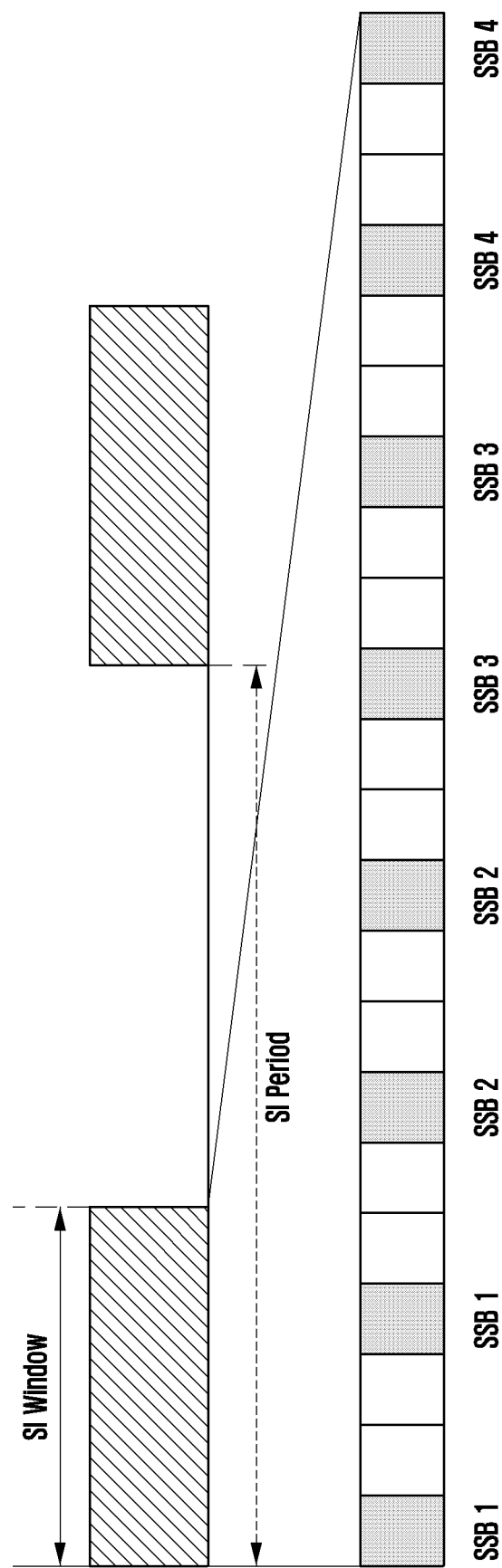
FIG. 12 illustrates mapping between PDCCH monitoring occasions for SI message reception and SSBs according to a second embodiment.

FIG. 12 illustrates mapping between PDCCH monitoring occasions for SI message reception and SSBs according to a second embodiment. There are 4 transmitted SSBs and the number of PDCCH monitoring occasions in the SI window is 8. SSB 1 (i.e. SSB corresponding to K equals 1) is mapped to 1st ((1−1)*2+1) and 2nd ((1−1)*2+2) PDCCH monitoring occasions. SSB 2 (i.e. SSB corresponding to K equals 2) is mapped to 3rd ((2−1)*2+1) and 4th ((2−1)*2+2) PDCCH monitoring occasions. SSB 3 (i.e. SSB corresponding to K equals 3) is mapped to 5th ((3−1)*2+1) and 6th ((3−1)*2+2) PDCCH monitoring occasions. SSB 4 (i.e. SSB corresponding to K equals 4) is mapped to 7th ((4−1)*2+1) and 8th ((4−1)*2+2) PDCCH monitoring occasions.

Based on mapping between PDCCH monitoring occasions for SI message reception and SSBs in the SI window as explained above, the UE can determine PDCCH monitoring occasions corresponding to one or more suitable SSBs (e.g. SSB with SS-RSRP above a threshold) and monitor only these PDCCH monitoring occasions in the SI window. Based on mapping between PDCCH monitoring occasions for SI message reception and SSBs in the SI window as explained above, the gNB transmits a PDCCH addressed to an SI-RNTI in the PDCCH monitoring occasions in the SI window using the DL beam corresponding to the SSB associated with that PDCCH monitoring occasion.

Figure 13:
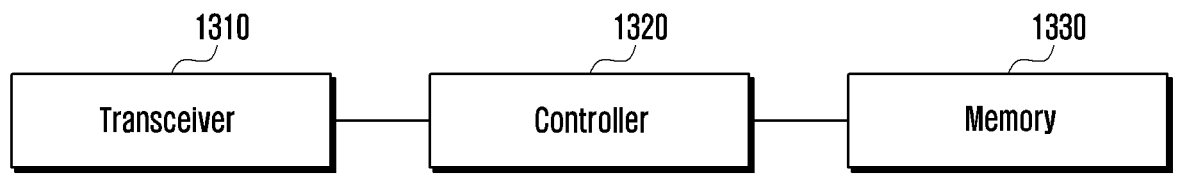
FIG. 13 is a block diagram of a terminal according to an embodiment of the disclosure.

FIG. 13 is a block diagram of a terminal according to an embodiment of the disclosure.

Referring to FIG. 13, a terminal includes a transceiver 1310, a controller 1320 and a memory 1330. The controller 1320 may refer to a circuitry, an ASIC, or at least one processor. The transceiver 1310, the controller 1320 and the memory 1330 are configured to perform the operations of the UE illustrated in the figures, e.g. FIGS. 1 to 12, or as otherwise described above. Although the transceiver 1310, the controller 1320 and the memory 1330 are shown as separate entities, they may be realized as a single entity like a single chip. The transceiver 1310, the controller 1320 and the memory 1330 may also be electrically connected to or coupled with each other.

The transceiver 1310 may transmit and receive signals to and from other network entities, e.g., a base station.

The controller 1320 may control the UE to perform functions according to one of the embodiments described above. For example, the controller 1320 is configured to control the transceiver 1310 to receive information on transmitted SSBs (e.g. ssb-PositionsInBurst) and configuration information on search space for SI message reception (e.g. osi-searchSpace) from a base station in SIB 1. The controller 1320 is configured to control the transceiver 1310 to receive a plurality of SSBs from the base station. The plurality of SSBs is indicated by the information on transmitted SSBs. The controller 1320 is configured to determine at least one PDCCH monitoring occasion associated with each of the plurality of SSBs in an SI window. The PDCCH monitoring occasions is indicated by the configuration information on search space for SI message reception. In addition, in order to determine the at least one PDCCH monitoring occasion, the controller 1320 may be further configured to sequentially number the at least one PDCCH monitoring occasion in the SI window from one, sequentially number the plurality of SSBs in ascending order of SSB indexes of the plurality of SSBs from one, and map an (x*N+K)th PDCCH monitoring occasion of the at least one PDCCH monitoring occasion in the SI window to a Kth SSB of the plurality of SSBs. The controller 1320 is configured to monitor at least one PDCCH monitoring occasion associated with at least one of the plurality of SSBs, and acquire the SI message.

In an embodiment, the operations of the terminal may be implemented using the memory 1330 storing corresponding program codes. Specifically, the terminal may be equipped with the memory 1330 to store program codes implementing desired operations. To perform the desired operations, the controller 1320 may read and execute the program codes stored in the memory 1330 by using a processor or a central processing unit (CPU).

Figure 14:
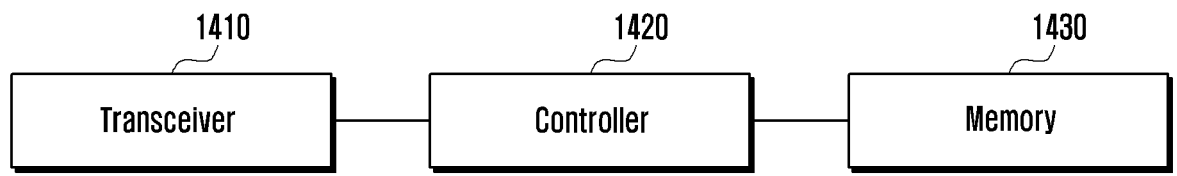
FIG. 14 is a block diagram of a base station according to an embodiment of the disclosure.

FIG. 14 is a block diagram of a base station according to an embodiment of the disclosure.

Referring to FIG. 14, a base station includes a transceiver 1410, a controller 1420 and a memory 1430. The controller 1420 may refer to a circuitry, an ASIC, or at least one processor. The transceiver 1410, the controller 1420 and the memory 1430 are configured to perform the operations of the network (e.g., gNB) illustrated in the figures, e.g. FIGS. 1 to 12, or as otherwise described above. Although the transceiver 1410, the controller 1420 and the memory 1430 are shown as separate entities, they may be realized as a single entity like a single chip. The transceiver 1410, the controller 1420 and the memory 1430 may also be electrically connected to or coupled with each other.

The transceiver 1410 may transmit and receive signals to and from other network entities, e.g., a terminal.

The controller 1420 may control the base station to perform functions according to one of the embodiments described above. For example, the controller 1420 is configured to control the transceiver 1410 to transmit information on transmitted SSBs and configuration information on a search space for SI message reception to a terminal in SIB 1. In addition, the controller 1420 is configured to control the transceiver 1410 to transmit a plurality of SSBs and an SI message to the terminal in at least one PDCCH monitoring occasion in an SI window using a downlink beam corresponding to an SSB associated with the at least one PDCCH monitoring occasion among the plurality of SSBs.

In an embodiment, the operations of the base station may be implemented using the memory 1430 storing corresponding program codes. Specifically, the base station may be equipped with the memory 1430 to store program codes implementing desired operations. To perform the desired operations, the controller 1420 may read and execute the program codes stored in the memory 1430 by using a processor or a CPU.

While the disclosure has been shown and described with reference to embodiments thereof, it will be understood by those skilled in the art that various changes in form and details may be made therein without departing from the spirit and scope of the disclosure as defined by the appended claims and their equivalents.

What is claimed is:

1. A method performed by a terminal for acquiring a system information (SI) message, comprising:
   receiving, from a base station, a plurality of synchronization signal blocks (SSBs);
   identifying at least one physical downlink control channel (PDCCH) monitoring occasion associated with each of the plurality of SSBs in an SI window, wherein an (x*N+K)th PDCCH monitoring occasion of the at least one PDCCH monitoring occasion in the SI window is mapped to a Kth SSB of the plurality of SSBs, where the at least one PDCCH monitoring occasion in the SI window is sequentially numbered from one, the plurality of SSBs are sequentially numbered in ascending order of SSB indexes of the plurality of SSBs from one, N is a number of the plurality of SSBs, and x is an integer greater than or equal to zero and less than a number of the at least one PDCCH monitoring occasion in the SI window divided by N; and
   monitoring at least one PDCCH monitoring occasion associated with at least one of the plurality of SSBs to acquire the SI message.

2. The method of claim 1, wherein the number of the at least one PDCCH monitoring occasion in the SI window is greater than the number of the plurality of SSBs.

3. The method of claim 1, further comprising:
   receiving, from the base station, information on the plurality of SSBs in a system information block (SIB) 1, wherein each of the plurality of SSBs is identified based on the information on the plurality of SSBs.

4. The method of claim 1, further comprising:
   receiving, from the base station, configuration information on a search space for SI message reception, wherein the at least one PDCCH monitoring occasion is identified based on the configuration information.

5. A terminal in a wireless communication system, comprising:
a transceiver; and
a controller coupled with the transceiver and configured to:
control the transceiver to receive, from a base station, a plurality of synchronization signal blocks (SSBs),
identify at least one physical downlink control channel (PDCCH) monitoring occasion associated with each of the plurality of SSBs in a system information (SI) window, wherein an (x*N+K)th PDCCH monitoring occasion of the at least one PDCCH monitoring occasion in the SI window is mapped to a Kth SSB of the plurality of SSBs, where the at least one PDCCH monitoring occasion in the SI window is sequentially numbered from one, the plurality of SSBs are sequentially numbered in ascending order of SSB indexes of the plurality of SSBs from one, N is a number of the plurality of SSBs, and x is an integer greater than or equal to zero and less than a number of the at least one PDCCH monitoring occasion in the SI window divided by N, and
monitor at least one PDCCH monitoring occasion associated with at least one of the plurality of SSBs to acquire an SI message.

6. The terminal of claim 5, wherein the number of the at least one PDCCH monitoring occasion in the SI window is greater than the number of the plurality of SSBs.

7. The terminal of claim 5,
wherein the controller is further configured to control the transceiver to receive, from the base station, information on the plurality of SSBs in a system information block (SIB) 1, and
wherein each of the plurality of SSBs is identified based on the information on the plurality of SSBs.

8. The terminal of claim 5,
wherein the controller is further configured to control the transceiver to receive, from the base station, configuration information on a search space for SI message reception, and
wherein the at least one PDCCH monitoring occasion is identified based on the configuration information.

9. A method performed by a base station for transmitting a system information (SI) message, comprising:

transmitting, to a terminal, a plurality of synchronization signal blocks (SSBs); and
transmitting, to the terminal, the SI message in at least one physical downlink control channel (PDCCH) monitoring occasion in an SI window using a downlink beam corresponding to an SSB associated with the at least one PDCCH monitoring occasion among the plurality of SSBs,
wherein an (x*N+K)th PDCCH monitoring occasion of the at least one PDCCH monitoring occasion in the SI window corresponds to a Kth SSB of the plurality of SSBs, where N is a number of the plurality of SSBs, x is an integer greater than or equal to zero and less than a number of the at least one PDCCH monitoring occasion in the SI window divided by N.

10. The method of claim 9, further comprising:
transmitting, to the terminal, information on the plurality of SSBs and configuration information on a search space for SI message reception in a system information block (SIB) 1.

11. A base station in a wireless communication system, comprising:
a transceiver; and
a controller coupled with the transceiver and configured to:
control the transceiver to transmit, to a terminal, a plurality of synchronization signal blocks (SSBs), and
control the transceiver to transmit, to the terminal, a system information (SI) message in at least one physical downlink control channel (PDCCH) monitoring occasion in an SI window using a downlink beam corresponding to an SSB associated with the at least one PDCCH monitoring occasion among the plurality of SSBs,
wherein an (x*N+K)th PDCCH monitoring occasion of the at least one PDCCH monitoring occasion in the SI window corresponds to a Kth SSB of the plurality of SSBs, where N is a number of the plurality of SSBs, x is an integer greater than or equal to zero and less than a number of the at least one PDCCH monitoring occasion in the SI window divided by N.

12. The base station of claim 11, wherein the controller is further configured to control the transceiver to transmit, to the terminal, information on the plurality of SSBs and configuration information on a search space for SI message reception in a system information block (SIB) 1.

* * * * *